(12) United States Patent
Ji et al.

(10) Patent No.: US 12,635,038 B2
(45) Date of Patent: May 19, 2026

(54) RELAY UE SELECTION

(71) Applicant: NOKIA TECHNOLOGIES OY, Espoo (FI)

(72) Inventors: Lianghai Ji, Aalborg (DK); Vinh Van Phan, Oulu (FI); Ling Yu, Kauniainen (FI); Rudraksh Shrivastava, Erligheim (DE); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 524 days.

(21) Appl. No.: 18/029,522

(22) PCT Filed: Sep. 20, 2021

(86) PCT No.: PCT/EP2021/075762
§ 371 (c)(1),
(2) Date: Mar. 30, 2023

(87) PCT Pub. No.: WO2022/078712
PCT Pub. Date: Apr. 21, 2022

(65) Prior Publication Data
US 2023/0363057 A1 Nov. 9, 2023

(30) Foreign Application Priority Data
Oct. 13, 2020 (EP) .................................... 20201488

(51) Int. Cl.
*H04W 88/04* (2009.01)
*H04W 76/16* (2018.01)

(52) U.S. Cl.
CPC ........... *H04W 88/04* (2013.01); *H04W 76/16* (2018.02)

(58) Field of Classification Search
None
See application file for complete search history.

(56) References Cited

U.S. PATENT DOCUMENTS 10,588,112 B2 3/2020 Lee et al.
2017/0086114 A1 3/2017 Jung et al.
(Continued)

FOREIGN PATENT DOCUMENTS

WO 2018/016882 A1 1/2018

OTHER PUBLICATIONS

International Search Report & Written Opinion dated Nov. 25, 2021 corresponding to International Patent Application No. PCT/EP2021/075762.
(Continued)

*Primary Examiner* — Nicholas Sloms
(74) *Attorney, Agent, or Firm* — Carter, DeLuca & Farrell LLP

(57) ABSTRACT
Inter-alia, a method is disclosed comprising: determining a suitability to serve as a relay device for a relayed communication between a first device and a second device via one or more relay devices to be selected among one or more relay device candidates; transmitting a message as part of a relay discovery procedure, and with the apparatus acting as one of the one or more relay device candidates; and performing at least one of a transmit power adjustment and/or a radio resource selection for transmitting the message based, at least in part, on the determined suitability.

1 Claim, 9 Drawing Sheets

(56) References Cited

U.S. PATENT DOCUMENTS

| 2017/0086125 A1* | 3/2017 | Seo | H04W 40/20 |
| 2017/0244468 A1* | 8/2017 | Zhao | H04W 36/06 |
| 2018/0063771 A1* | 3/2018 | Singh | H04B 7/15507 |
| 2018/0084478 A1* | 3/2018 | Lee | H04W 28/12 |
| 2018/0139667 A1* | 5/2018 | Yu | H04W 36/023 |
| 2018/0295671 A1* | 10/2018 | Kim | H04W 76/00 |
| 2018/0310293 A1* | 10/2018 | Lee | H04W 72/20 |
| 2019/0028906 A1* | 1/2019 | Chen | H04W 72/02 |
| 2019/0053305 A1 | 2/2019 | Saiwai et al. | |
| 2019/0281582 A1 | 9/2019 | Chen et al. | |
| 2020/0008127 A1 | 1/2020 | Ohtsuji | |
| 2020/0154290 A1 | 5/2020 | Lee et al. | |
| 2020/0163155 A1 | 5/2020 | Lee et al. | |
| 2021/0297842 A1* | 9/2021 | Shrivastava | H04W 28/24 |
| 2022/0224409 A1* | 7/2022 | Perras | H04B 7/2606 |
| 2022/0303866 A1* | 9/2022 | Zhang | H04W 40/22 |
| 2023/0189102 A1* | 6/2023 | Xu | H04W 40/12 370/315 |
| 2023/0413171 A1* | 12/2023 | Perras | H04W 92/18 |

OTHER PUBLICATIONS

Nokia Networks, Power control impacts on PC5 measurements for relay selection, 3GPP Draft; R1-154480, 3GPP TSG-RAN WG1 Meeting #82, Beijing, China, Aug. 24-28, 2015; Aug. 23, 2015, XP051001763.

"Discussion and TP on UE to UE Relay Based on L2 Relay Architecture", 3GPP RAN WG2 Meeting #111-e, R2-2006760, InterDigital Inc., Agenda Item: 8.7.3, Aug. 17-28, 2020, pp. 1-6.

"New WID on NR sidelink enhancement ", 3GPP TSG RAN Meeting #86, RP-193231, LG Electronics, Agenda Item: 9.1.1, Dec. 9-12, 2019, 6 pages.

"New SID: Study on NR sidelink relay", 3GPP TSG RAN Meeting #86, RP-193253, OPPO, Agenda Item: 9.1.2, Dec. 9-12, 2019, pp. 1-5.

"3rd Generation Partnership Project; Technical Specification Group Services and System Aspects; Study on system enhancement for Proximity based Services (ProSe) in the 5G System (5GS) (Release 17)", 3GPP TR 23.752 V0.4.0, Jun. 2020, pp. 1-121.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V16.3.0, Jul. 2020, pp. 1-57.

"3rd Generation Partnership Project; Technical Specification Group Services and System Aspects; Proximity-based services (ProSe); Stage 2 (Release 16)", 3GPP TS 23.303 V16.0.0, Jul. 2020, pp. 1-130.

"Discussion on relay selection and reselection", 3GPP TSG-RAN WG2 Meeting #112 Electronic, R2-2009069, Nokia, Agenda item: 8.7.3.3, Nov. 2-13, 2020, 2 pages.

"3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

"3rd Generation Partnership Project; Technical Specification Group Radio Access Network; NR; Physical layer procedures for data (Release 16)", 3GPP TS 38.214 V16.2.0, Jun. 2020, pp. 1-163.

Extended European Search Report received for corresponding European Patent Application No. 20201488.2, dated Mar. 18, 2021, 9 pages.

Office action received for corresponding European Patent Application No. 20201488.2, dated Dec. 2, 2024, 6 pages.

* cited by examiner

RELAY UE SELECTION

FIELD

The following disclosure relates to the field of mobile communication networks, or more particularly relates to systems, apparatuses, and methods for enhancing UE relay selection for relayed communications.

BACKGROUND

LTE sidelink (SL) and NR SL have been standardized to support proximity service (ProSe), e.g. public safety and vehicle-to-everything (V2X) communication in 3GPP. In 3GPP, sidelink is used to provide a wider coverage of commercial use cases.

Currently, a proximity reachability is limited to single-hop sidelink, either via EUTRA-based or NR-based sidelink technology. However, single-hop sidelink transmission may not be sufficient in scenarios where there is no Uu coverage, considering the limited single-hop sidelink coverage.

In order to extend sidelink coverage in a large range of applications and services, UE-to-UE relay or UE-to-network relay is considered. UE-to-UE relay (i.e. Relay UE) is applied to facilitate the communication between two UEs (i.e. UE1 and UE2) without transmitting the data through any network (mobile communication network) infrastructure. UE-to-network relay is applied in a same way to facilitate communication between a UE and a base station (e.g. gNB) of a mobile communication network, wherein the UE e.g. may be out of direct reachability of the network. A UE1 or a respective base station may not be able to reach another UE2 directly via single-hop, e.g. due to the large pathloss value between UE1/base station and UE2. Thus, another UE can act as the relay, to relay the traffic between the UE1 respective the base station and UE2, e.g. via sidelink or Uu interface. It is noted, besides coverage extension, UE-to-UE relay and UE-to-network relay can also be used for other purpose, such as power efficiency improvement. For example, though UE1 or a respective base station and UE2 may be in the reachability range of single-hop, the pathloss between UE1 or a respective base station and UE2 may still be high. Thus, applying a relay UE located between UE1 respectively the base station and UE2 may introduce a smaller pathloss between UE1 or a respective base station and Relay UE, which can reduce the transmit power and save the energy at UE1 and/or UE2, as well as reduce potential interference for other UEs in the area.

This requires a relay (re-)selection procedure for an end-to-end (E2E) communication between such UE1 or a respective base station and UE2, e.g. between multiple relay candidates available for (re-)selection. The (re-)selection is based on, e.g. a PC5 link quality, a SL-reference signal received power (RSRP), a radio signal strength of a sidelink discovery message. To establish the relayed connection, UE2 sends a message, e.g. a request accept message to the relay of the selected path, and that relay will be used to establish the UE-to-UE or the UE-to-network relayed connection and forward the data between UE1 or a respective base station and UE2.

Thus, the current approach does not consider additional radio-related information. This relay selection procedure leads to a sub-optimal selection and low E2E radio efficiency to exploit either single-hop or multi-hop UE-to-UE relay and UE-to-network relay.

SUMMARY OF SOME EXEMPLARY EMBODIMENTS

One straight-forward approach to improve the accuracy/efficiency for the relay selection procedure may be for each relay candidate to send relevant information to the target UE explicitly along all possible/potential paths. Thus, besides the SL-RSRP, the target UE may also consider the additional explicitly received information to select the best path/relay. However, such a procedure would introduce a large signaling overhead, especially in multi-hop relay scenario, as the amount of explicit information to be transmitted to the target UE depends on the number of hops and/or the number of potential paths between the two E2E devices.

It is thus, inter alia, an object to define a mechanism to transmit the relay-selection-related information to the target/remote device so that the aforementioned problem of excessive signaling overhead is eliminated while allowing a global-optimal relay selection at the target/remote device.

According to a first exemplary aspect, a method is disclosed, the method comprising:

determining a suitability to serve as a relay device for a relayed communication between a first device and a second device via one or more relay devices to be selected among one or more relay device candidates;

transmitting a message as part of a relay discovery procedure, and with the apparatus acting as one of the one or more relay device candidates; and performing at least one of a transmit power adjustment and/or a radio resource selection for transmitting the message based, at least in part, on the determined suitability.

This method may for instance be performed and/or controlled by an apparatus, for instance a mobile device, e.g. a mobile terminal, UE, smartphone, tablet, (I)IoT ((Industrial) Internet-of-Things)-device, wearable, or a combination thereof, to name but a few non-limiting examples. The apparatus may be a relay device candidate and/or a relay device serving as a relay device between a source device and a target device of a relayed communication. Such a relay device or relay device candidate may also be referred to as UE-to-UE or UE-to-network relay device. For instance, the method may be performed and/or controlled by using at least one processor of the mobile device. The mobile device may be an entity of the mobile communication network.

According to a second exemplary aspect, a method is disclosed, the method comprising:

receiving a message as part of a relay discovery procedure for a relayed communication between a first device and the apparatus via one or more relay devices to be selected among one or more relay device candidates, wherein the message is received via a certain SL radio resource;

selecting a relay device based, at least in part, on the SL radio resource through which the message is received; and sending a further message enabling the relayed communication towards the first device via the selected relay device.

This method may for instance be performed and/or controlled by an apparatus, for instance a mobile device, e.g. a mobile terminal, UE, smartphone, tablet, (I)IoT-device, wearable, or a combination thereof, to name but a few non-limiting examples. The apparatus may be a target/remote device of a SL communication between a source device/network node and such a target/remote device via one or more relay devices in between. For instance, the method may be performed and/or controlled by using at least one processor of the mobile device. The mobile device may be an entity of the mobile communication network.

According to a further exemplary aspect, a computer program is disclosed, the computer program when executed by a processor causing an apparatus, for instance an electronic device, to perform and/or control the actions of the method according to the first and/or second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first and/or second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first and/or second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:

at least one first apparatus according to the first exemplary aspect as disclosed above, and at least one second apparatus according to the second exemplary aspect as disclosed above, e.g. performing and/or controlling the respective methods according to the first and/or second exemplary aspects together.

In the following, exemplary features and exemplary embodiments of all aspects will be described in further detail.

A mobile communication network, as used herein, refers to a network that can be utilized by one or more mobile devices. Such a mobile communication network typically operates in accordance with a given standard or specification which may set out what the various entities (e.g. the one or more mobile devices, one or more base stations respectively radio access nodes (e.g. gNBs) associated with the mobile communication network, or one more core network entities/functions) are permitted to do and how that should be achieved. Communication protocols and/or parameters which shall be used for the connection are also typically defined. Examples of standardized radio access technologies comprise GSM (Global System for Mobile), EDGE (Enhanced Data for GSM Evolution), Radio Access Networks (GERAN), Universal Terrestrial Radio Access Networks (UTRAN), evolved UTRAN (E-UTRAN), fifth generation (5G) New Radio (NR), to name but a few non-limiting examples. An example of standardized communication system architecture is Long-term Evolution (LTE) of the Universal Mobile Telecommunications Systems (UMTS) Radio Access Technology. LTE is standardized by the $3^{rd}$ Generation Partnership Project (3GPP). The LTE employs E-UTRAN access. Further developments are referred to as LTE Advanced (LTE-A), 5G, or 5G+, and/or NR communication standard.

Such an apparatus (e.g. a mobile device) according to the first and/or to the second exemplary aspect, as used herein, may for instance be portable (e.g. weigh less than 1, 0.8, 0.6, 0.4, 0.2, 0.1 kg, or less), like a mobile phone, personal digital assistance device, computer, laptop computer, a UE, an (I)IoT device, or a combination thereof as non-limiting examples. The apparatus may for instance comprise or be connectable to a display for displaying information. The apparatus may for instance comprise or be connectable to means for outputting sound, e.g. in the form of spoken commands or information. The apparatus may for instance comprise or be connectable to one or more sensors for determining the devices position, such as for instance a GNSS receiver, in the form of a GPS receiver. The apparatus may for instance comprise or be connectable to one or more sensors, e.g. in the form of an accelerometer and/or a gyroscope and/or magnetometer and/or barometer for gathering (e.g. measuring) further information, such as motion sensor data. The apparatus may for instance comprise or be connectable to a receiver and/or a transmitter (e.g. a transceiver) for receiving and/or sending information, e.g. via a SL or Uu interface.

The apparatus according to the first exemplary aspect may for instance be a relay device/UE, e.g. which may enable a communication between another apparatus (the first device/UE, e.g. source device/UE) and an apparatus according to the second exemplary aspect (the second device, e.g. a target/remote device/UE).

The message may be a message for initiating (e.g. SL) communication or any message that is part of a discovery procedure or of a subsequent procedure of the discovery procedure. The message may be a communication request message, a discovery announcement message, a discovery response message or a discovery solicitation message, to name but a few non-limiting examples.

The message may optionally be received by such an apparatus according to the first exemplary aspect, e.g. a relay device serving as one of one or more relay device candidates for the first device and/or the second device prior to the transmitting of the message. The message may be a communication request message which may be indicative of initiating a sidelink communication between the first device (e.g. a source device) and the second device (e.g. a target/remote device) via one or more further relay devices. The message may be a part of a relay discovery procedure. The message may be received from another device (UE) which may request a SL communication. Potential relay device candidates may be implicitly or explicitly indicated in the message. They may be implicitly indicated by the message being provided to certain relay device candidate(s). They may be explicitly indicated in the message, e.g. by a respective identifier of the respective relay device candidate(s) being comprised by the message. The message may be provided to such potential respectively suitable relay device candidates, and not to devices that are known to be not suitable relay device candidates. The message may be provided from a respective source device to such one or more relay device candidates by transmitting the message via SL to the respective relay device candidates. This may be done in case of a UE-to-UE relaying. Alternatively, in case of a UE-to-network (e.g. mobile communication network) relaying, the message may be a discovery response message or a discovery announcement message. The message is transmitted as part of a relay discovery procedure, e.g. for a (e.g. SL) relayed communication. The message may be for initiating the relayed communication. Alternatively, the initiation may take place on part of a base station (e.g. a gNB) of a mobile communication network for a UE-to-network relaying, or by a source device representing the first device for UE-to-UE relaying via the apparatus according to the first exemplary aspect. In the latter case, the apparatus according to the first exemplary aspect may receive the message prior to the transmitting of the message and the performing.

The apparatus according to the first exemplary aspect may act as one of the one or more relay device candidates when the message is transmitted.

Which relay device candidates serves respectively acts as a respective relay device, or in case of a plurality (e.g. at least two) hops between a respective source device and a respective target/remote device which respective relay devices, is to be selected by the respective target/remote device (apparatus according to the second exemplary aspect).

Functionally, the message may be a message and/or signal for one of the involved apparatuses (e.g. source device, one or more relay device(s) or relay device candidates, target/remote device) to detect radio reachability and/or derive at least one radio condition with another of the involved apparatuses besides requesting for possible communication.

Content-wise, such a message may contain or comprise at least a Destination L2 identifier (ID), a Source L2 ID, Discovery Group ID, or a combination thereof, to name but a few non-limiting examples.

For instance, the message may be a message similar to a direct communication request message e.g. standardized according to 3GPP NR SL standard. Additionally or alternatively, the message may be a direct message.

As another example, the message may be a message similar to a legacy discovery announcement/solicitation/response message e.g. as used in model A/B discovery procedure as disclosed in 3GPP communication standard.

Prior to transmitting the message to another relay device candidate or to the second (e.g. target/remote) device by a respective relay device candidate (apparatus according to the first exemplary aspect), it may be determined if the apparatus according to the first exemplary aspect is suitable to serve as a relay device for a relayed communication between a first device (e.g. source UE) and a second device (e.g. target/remote UE). To serve as a relay device, as used herein, is to be understood that it (the apparatus according to the first exemplary aspect) can serve as a relay device between the first (e.g. source) device e.g. from which a message may optionally be received, and the second (e.g. target/remote) device. For a UE-to-network relaying, the first device may be a gNB and the second device may be a target/remote device.

Thus, upon optional receiving of the message, a respective relay device (e.g. apparatus according to the first exemplary aspect) may determine (e.g. check) if it can act as the respective relay device. For instance, the apparatus may check if it is located within a certain range, e.g. indicated by the source device (e.g. in the received message), or if a SL-RSRP of a reference signal associated with the received message or of the received message is past a certain threshold, to name but a few non-limiting examples.

The apparatus according to the first exemplary aspect may further check if a respective service/application identifier, e.g. carried in respectively comprised by the message may be included or matches at least one (e.g. pre-) configured service to apply (e.g. perform) at least one of the transmit power control and/or radio resource selection. Such a configured service may be provided to the apparatus according to the first exemplary aspect via a configuration, disclosed in more detail with regard to an exemplary embodiment of all exemplary aspects.

If the apparatus according to the first exemplary aspect determines that it is suitable to act/serve as a respective relay device, at least one of a transmit power adjustment and/or a radio resource (e.g. a time-and/or-frequency resource) selection for transmitting the message is performed. Thus, if the outcome of the determining of the suitability is positive, the apparatus according to the first exemplary aspect determines that it is a suitable relay device candidate, the performing is done. Thus, if the outcome of the above check is positive, a respective relay device candidate may perform the proposed transmit power adjustment and/or the radio resource selection to transmit the message to or towards the target/remote device, e.g. by using a provisioned configuration or based on such a provisioned configuration. The configuration may enable the performing of at least one of the transmit power adjustment and/or the radio resource selection. Such a configuration may be obtained (e.g. received) from a mobile communication network, e.g. a serving base station for the apparatus according to the first exemplary aspect. Alternatively, such a configuration may also be pre-configured in the apparatus.

The performing, as used herein, may be understood that a (e.g. SL) transmit power with which the message is to be transmitted, e.g. in order to arrive via one or more relay device candidates at the target/remote device, can be or is adjusted. Further, this may in addition or in the alternative comprise that the message is to be transmitted via a certain (e.g. SL) radio resource, e.g. a certain (e.g. SL) time- and/or frequency radio resource. One or both of the aforementioned may enable the recipient—the second device—e.g. the target/remote device, to select based on the power (actually the corresponding received power/quality as measured by the second device) (and/or the radio resource used by a suitable relay device for sending the message or data traffic, e.g. implicitly without requiring dedicated signaling. Then, relayed communication between the first device and the second device can be unidirectional or bidirectional established. In the latter case, it is referred to the first device e.g. transmitting the message as the source device, although data can be transmitted from the second device (e.g. target/remote device) to the first device, and vice versa.

After the performing, the message is transmitted, e.g. using the adjusted transmit power and/or the selected resource radio resource according to the performing. The first device may transmit the message to the UE-to-UE or UE-to-network relay device candidates. These may be UEs that are suitable for relay functionality in the proximity of the first device. Thus, the message may be transmitted by the apparatus according to the first exemplary aspect to one or more other relay device candidates or to the second device, depending on whether the second device is within a range suitable to receive the message from the apparatus according to the first exemplary aspect. In case of a multi-hop relaying, the message may be transmitted to one or more other apparatuses according to the first exemplary, which may follow along the discovery path or communication chain.

Further, additional information may be transmitted comprised by the message, and/or accompanying the message, e.g. to assist the second device or a relay device candidate to select the best or most suitable UE-to-UE or UE-to-network relay device and/or relaying path comprising one or more relay devices for the communication with the first device among one or more relay device candidates from which a respective message is received by the second device (e.g. target/remote device). Such additional information may be transmitted from (e.g. each) UE-to-UE or UE-to-network relay device candidate to one or more other relay device candidates or to the second device, e.g. by adjusting the transmit power or via a certain determined radio resource, as disclosed above, when transmitting the message. Also, the message may comprise additional information or the additional information accompanying the message (e.g. implicitly), enabling selection of a relay device further based on such additional information.

The transmit power adjustment at a UE-to-UE or UE-to-network relay device candidate may be configured as a function of the different aspects related to a suitability, an efficiency and/or a performance of serving as a relay device for the considered end-to-end (E2E) communication between the first device and the second device. These may include or comprise one or multiple criteria. e.g., a condition of a prior-hop, the ability or suitability to support the relay function, the resource allocation mode, and/or one or more quality of service (QoS) requirements of the relayed service, to name but a few non-limiting examples.

The respective UE- to UE or UE-to-network relay device candidate with a good suitability, efficiency, performance, or a combination thereof, may use a high transmit power for transmitting the message. For instance, for adjusting the (e.g. SL) transmit power, the apparatus according to the first exemplary aspect may be configured with at least one transmit power offset (e.g. $\sigma$). The apparatus according to the first exemplary aspect may add this offset to a default transmit power (e.g. $P^{default}$), while keeping the transmit power below the maximum allowed transmit power $$P_{max}^{current} \cdot P_{max}^{current}$$

can be derived by using the legacy (e.g. SL) transmit power adjustment, which may limit the maximal transmit power. Thus, the (e.g. SL) transmit power at the apparatus according to the first exemplary aspect may be calculated as $$\min\left(P_{max}^{current}, P^{default} + \sigma \times n\right),$$

where n represents the number of criteria fulfilled. In another example, the apparatus according to the first exemplary aspect may be configured to use different radio resource(s)

or different sizes of radio resource(s) for transmitting the message. Different radio resource(s) or different sizes of radio resource(s) may be configured to correspond to different suitability levels of the apparatus according to the first exemplary aspect for acting as a relay device.

This may allow a transmit power adjustment and/or a radio resource selecting at a UE-to-UE or UE-to-network relay device candidate to reflect efficiency-related aspects, since a relay with better capability/efficiency/performance can use a higher SL transmit power for sending/forwarding the communication request message. Further, this may be enabled by an implicit signaling having little impact on existing signaling protocols by transmitting the message with a certain adjusted transmit power and/or via a certain selected radio resource to the second device (e.g. target/remote device).

According to an exemplary embodiment of all exemplary aspects, the method further comprising:

obtaining (e.g. receiving) a configuration for the performing.

At least one or more of the relay device candidates may be provisioned with the configuration based on which, at least in part, the message may be transmitted. For instance, a transmit power adjustment, and/or radio resource selection may be comprised by the configuration. Thus, the respective apparatus(es) according to the first exemplary aspect may obtain (e.g. receive) the configuration. Additionally or alternatively, the apparatus(es) according to the first exemplary aspect may obtain the configuration, e.g. by retrieving the configuration from a memory. For instance, the configuration may be stored in a memory comprised by or connectable to the apparatus(es) according to the first exemplary aspect, e.g. during manufacturing, or prior to performing and/or controlling the method according to the first exemplary aspect. It will be understood that such a stored configuration may also be updated, e.g. by a mobile communication network, e.g. by providing (e.g. sending) a new configuration to the respective apparatus(es) according to the first exemplary aspect. Thus, different approaches may be used to carry out the mentioned configuration provision. Some examples are given in the following:

The mobile communication network may use a system information block (SIB) to activate and configure the performing of at least one of transmit power adjustment (e.g. transmit power control (TPC)) and/or radio resource selection over a certain validity area, such that the respective apparatus(es) in the validity area may apply the same configuration for transmit power adjustment and/or radio resource selection.

The respective apparatus(es) out of mobile communication network coverage may use a common pre-configuration, e.g. provided to the apparatus e.g. in advance.

The respective apparatus(es) may apply an internal configuration to support the proposal. For example, the respective apparatus(es) may belong to the same owner, such as devices in a factory, and the configuration may be implemented (e.g. stored in a memory) into the devices, e.g. during manufacturing, as disclosed above.

In an example embodiment according to all exemplary aspects, for adjusting the transmit power at a respective apparatus according to the first exemplary aspect, the respective apparatus may be configured, e.g. by the mobile communication network or internal configuration implementation, with a (e.g. SL) transmit power offset (e.g. $\sigma$) or a (e.g. SL) transmit power offset range. Thus, e.g. if any criteria weighted criteria (more details are disclosed below) are beneficial for the E2E efficiency and are fulfilled, the respective apparatus may add this offset to a calculated (default) transmit power $$(e.g. \; P^{default})$$

which may still be below $$P^{current}_{max},$$

for instance according to $$\min\!\left(P^{current}_{max}, P^{default} + \sigma \times n\right),$$

as disclosed above.

According to an exemplary embodiment of the first exemplary aspect, the suitability is determined (e.g. further) based on whether at least one service and/or at least one scenario is to be provided via the relayed communication.

For instance, the configuration obtained by the apparatus according to the first exemplary aspect may comprise the at least one service (e.g. Internet-of-Things (IoT)/Industrial IoT (IoT) service) and/or at least one scenario (e.g. in static/semi-static mobility scenario, to name but a few non-limiting examples). Further, the at least one service and/or the at least one scenario may be associated with a certain or pre-defined transmit power adjustment and/or radio resource selection to be performed.

Further, the supported at least one service and/or at least one scenario may be configured/identified by using respective service/application/group identifiers. Then, a checking of a respective identifier of a service and/or scenario to be provided may be compared with one or more identifiers comprised by or accompanying the obtained configuration. Thus, the configuration may define with the one or more identifiers that the performing of the transmit power adjustment and/or radio resource selection is performed for a specific service, as defined by a respective identifier of the one or more identifiers.

According to an exemplary embodiment of the first exemplary aspect, the suitability is further determined based on a range between the apparatus and a prior-hop device along a discovery path from the first device to the second device through the apparatus, and/or a Reference Signal Received Power, RSRP of a reference signal transmitted by the prior-hop device, and/or a Reference Signal Received Quality, RSRQ of a reference signal transmitted by the prior hop device.

A prior-hop device, as used herein, refers to one or more UE-to-UE or UE-to-network relay device candidate that may be used to facilitate point-to-point (P2P) and/or point-to-multi-points (P2MP) communication in a single or multi-hop scenario. In case of a single hop scenario, the prior-hop device may be the first device. In case of the multi-hop scenario, the prior-hop device may be another relay device candidate being in a position before the apparatus according to the first exemplary aspect along the discovery path respectively communication chain. The discovery path may be a path enabling transmitting of data between the first device and the second device.

According to an exemplary embodiment of all exemplary aspects, the first device is a base station of a mobile communication network, and the second device is a User Equipment, UE, the relayed communication is a UE-to-network (NW) relayed communication, and the message is a discovery announcement/response message for a UE-to-network relaying.

According to an exemplary embodiment of all exemplary aspects, the first device and the second device are User Equipment, UE, the relayed communication is a relayed sidelink, SL, UE-to-UE communication, and the method further comprises:

receiving a prior message as part of the relay discovery procedure, wherein the message is transmitted responsive to receiving the prior message.

According to an exemplary embodiment of the first exemplary aspect, the performing is based on at least one weighted criterion.

The at least one weighted criterion may be configured with one or multiple weights, e.g. in order to enable the apparatus to derive the transmit power for transmitting the message.

For instance, the apparatus according to the first exemplary aspect may select the weight to derive the transmit power, e.g. by considering the target/trigger/cause/reason of the request for the relayed communication as requested by the first device. Further, the apparatus according to the first exemplary aspect may consider a hop index that the apparatus (relay device) acts as a transmitter for the next hop to select the weight to derive the SL transmit power.

If, for example, the target, trigger, cause, or a combination thereof, for setting up the apparatus (relay device candidate) is to reduce the energy consumption at the first device (e.g. source device), the apparatus (relay device candidate) may consider using a higher weight to reflect the first/prior hop condition, compared with the weight to reflect the second/next hop condition. Thus, a better first hop may be prioritized such that the first device (e.g. source device) may save its energy. This may allow to reflect target/trigger/cause/reason-related criteria with a higher weight and, thus, the selection of the best relay device can be tailored as target/trigger/cause/reason-oriented.

According to an exemplary embodiment of the first exemplary aspect, the at least one weighted criterion is at least one of the following:

a condition of a prior hop along a discovery path from the first device to the second device through the apparatus;

a resource availability;

a resource stability;

a relaying load of the apparatus; and one or more Quality of Service, QoS, requirements of at least one service to be provided via the relayed communication.

For instance, the performing of the transmit power adjustment by the apparatus according to the first exemplary aspect, which is used by the respective apparatus (relay device candidate) to transmit the message may be configured as a function of different relevant criteria, as disclosed above. In addition, a respective and relevant criterion may be assigned with at least one weight enabling the apparatus to derive a respective transmit power for transmitting the message.

Such a weighted aspect may be a condition of the prior hop:

In case the first device (e.g. source device) indicates its location and the required range for the apparatus according to the first exemplary aspect (relay device candidate(s)), the respective relay device candidate may use a higher (e.g. SL) transmit power if there is a smaller distance from the first device. In this case, there may be a higher chance/likelihood that the respective apparatus according to the second exemplary aspect (target/remote device) may select the relay device candidate with a higher transmit power as its/the relay device, since the target device may detect a higher (e.g. SL-) RSRP from this relay device candidate.

Further, SL Discontinuous Reception (DRX) may be used to save the power consumption for the relayed communication. Thus, for instance the SL transmission and reception at a respective apparatus may take place (e.g. only) during the SL DRX on-period. Thus, if the relay device candidate is aware that SL DRX can be applied at the first device (e.g. in case there has been already a connection between the source device and the relay device (e.g. candidate) before or upon the relay selection procedure is initiated (e.g. by transmitting the message), it may apply a higher SL transmit power in case there is a larger aligned SL DRX on-period of the prior-hop between the first device and the respective relay device candidate. This operation may be beneficial for at least one service that may require a high data rate, e.g. since a duration of the aligned SL DRX on-period may determine the data rate that can be supported over the prior-hop via the SL communication.

Further, such a weighted criterion may be an ability of the apparatus according to the first exemplary aspect (relay device/relay device candidate) to support the UE-to-UE or UE-to-network relay function. For instance, a respective apparatus according to the first exemplary aspect may check SL resource availability to support the relay function between the first device(s) and the respective second (e.g. target/remote) device(s). Thus, the respective relay device candidate with better SL resource availability (e.g. a mode 2 UE) or better stability to obtain SL resource (e.g. a mode 1 UE) may use a higher SL transmit power for transmitting the message indicating its better ability to act/serve as a respective relay device, e.g. by considering the QoS requirements of the service.

A respective relay device candidate may serve as a relay device between more than one first devices and more than one second devices.

If the apparatus according to the first exemplary aspect can operate in an autonomous SL resource selection mode (e.g. NR SL mode 2), it may measure a channel busy ratio (CBR) and/or may derive a channel occupancy ratio (e.g. parameter CR-Limit) which may indicate the maximal/ available amount of SL resources the respective relay device can use or handle.

If there is other SL-related activity (e.g. apparatuses' own V2X, relay services for serving other target/remote UEs, or ProSe service(s)) at the respective relay device candidate, the amount of available SL resources may be needed to be determined, e.g. by deducting one or more radio resources used for other SL transmissions or SL communications from the parameter CR-Limit. This may be allowed if the other SL transmissions or communications are operating in the same resource pool or on the same (sub-)carrier, to name but a few non-limiting examples.

If the mobile communication network assigns one or more SL resources for the respective relay device candidate (e.g. the relay UE may operate in NR SL mode 1), the respective relay device may further check its Uu condition. For instance, the respective relay device may check its Uu radio condition to determine a stability to obtain SL resources assigned by the mobile communication network, wherein the stability may be one criteria to be considered by the transmit power adjustment at a relay device candidate.

Additionally or alternatively, if the respective relay device candidate operates in Mode 1, the respective relay device candidate may have restricted ability to obtain dynamic resource(s) for the SL communication, since it may operate with cross-Radio Access Technology (RAT) sidelink control. Then, the respective relay device candidate may use a lower SL transmit power for further relay service(s) requiring frequent and dynamic transmissions, comparing to the SL transmit power at another relay device candidate operating in intra-RAT sidelink control. This may allow a remote/target UE to select a relay device in intra-RAT sidelink control mode and capable of requesting dynamic resources with a higher probability.

Another of such a weighted criterion may be that a respective relay device candidate with better SL suitability may transmit with a higher power, e.g. by considering:

Maximum SL transmit power capability:
   For example, a respective relay device candidate having a larger battery may use a higher SL transmit power than another relay device candidate having in comparison more limited battery capacity. This may increase the possibility that the apparatus according to the second exemplary aspect (target device) selects the respective relay device candidate as its serving relay device, since it has less energy constraint.

Hardware limitation:
   For example, a relay device candidate supporting multiple input multiple output (MIMO) scheme(s) may use a higher SL transmit power than a relay device candidate not supporting MIMO, since e.g. spectral efficiency of E2E communication can be improved by using MIMO.

Restricting activities:
   The respective relay device candidate may also check if it has other (e.g. UE-) activities (e.g. Uu/SL activities with other UEs respectively mobile devices, and/or the mobile communication network) that may distract itself from serving as a respective relay device. Thus, a less loaded relay device candidate may use a higher SL transmit power.

QoS requirements:
   The resource allocation mode used for UE-to-UE or UE-to-network relay may be performed by considering the QoS requirements of the at least one service and/or the at least one scenario that is requested. Some QoS requirement examples are given below:
   If the at least one service and/or scenario to be relayed between the first device and the second device requires a high reliability, a relay device candidate in Mode 1 may use a higher SL transmit power than a relay device candidate in Mode 2, as the radio resource allocated by the mobile communication network in Mode 1 may have a lower resource collision rate than an autonomous selected resource in Mode 2.
   If the at least one service and/or scenario requires a low latency, a relay device candidate in Mode 2 may use higher SL transmit power than a relay device candidate in Mode 1, as a relay device candidate in Mode 2 may not be required e.g. to wait for a respective SL resource assignment from mobile communication network prior to transmitting the message and/or relaying traffic between the first device and the second device.

According to an exemplary embodiment of the first exemplary aspect, the at least one weighted criterion is configured with multiple weights based on which the transmit power for transmitting the message is derived.

The at least one weighted criterion may be configured or associated with one or multiple weights e.g. to derive the (e.g. SL) transmit power to be used for transmitting the message. The apparatus (relay device candidate) may determine (e.g. select) the proper weight to derive the transmit power based, at least in part, on one or more conditions.

According to an exemplary embodiment of the first exemplary aspect, a respective weight of the at least one weighted criterion is selected based on at least one of the following conditions:

considering reason for establishing the relayed communication, e.g. with the second (e.g. target/remote) device (e.g. to apply UE-to-UE or UE-to-network relaying); and considering a hop index of the apparatus along a discovery path from the first device to the second device through the apparatus.

The apparatus may select the respective weight(s) by considering the target/trigger/cause/reason to apply UE-to-UE relaying or UE-to-network relaying:

For instance, if the target/trigger/cause for setting up a UE-to-UE relaying or UE-to-network relaying is to reduce the energy consumption at the first device/UE, the relay device/UE candidate may consider using a higher weight to reflect the first/previous hop condition (e.g. the distance/pathloss/SL-RSRP from the first device/UE), compared with the weight to reflect the second/next hop condition. In this way, a better first/previous hop is prioritized than a better second/next hop such that the first device/UE may save its energy. This approach may enable to reflect the target/remote device-related aspect(s) with a proper weight and, thus, the selection of the best relay device/UE among one or more relay device/UE candidates can be tailored as target-oriented.

A target/trigger/cause/reason may be configured (semi) statically and/or commonly, e.g. by the mobile communication network or device-implementation, or dynamically by a respective source/target device to a respective relay device.

The UE-to-UE or UE-to-network relay device may consider its hop index or hop number:

In case the apparatus according to the first exemplary aspect is used to facilitate P2P or point-to-multi-points (P2MP) communication in a multi-hop scenario e.g. via SL, a respective relay device candidate may use a different weight from another relay device candidate, e.g. by considering its hop positioning in the communication chain e.g. that may be represented by the discovery path.

According to an exemplary embodiment of the first exemplary aspect, the radio resource selection further comprises:

determining at least one time-and/or-frequency (e.g. SL) radio resource for transmitting the message.

The time-and/or-frequency radio resource to be used by the apparatus (relay device candidate) for transmitting the message may be determined. The radio resource used for transmitting the message may be determined based on a time domain preference, and/or a frequency domain preference.

The determined resource(s) (e.g. transmit power, and/or time-and/or-frequency radio resource) may be used to transmit (e.g. forward) the message to the second device.

According to an exemplary embodiment of the first exemplary aspect, the message is transmitted via the determined at least one time-and/or-frequency radio resource.

According to an exemplary embodiment of the first exemplary aspect, the radio resource via which the message is transmitted indicates SL Discontinuous Reception, DRX, information associated with the apparatus.

A transmitted message may indicate SL discontinuous reception (DRX) information of the apparatus transmitting the message, e.g. as additional information. The SL DRX information may be used by an apparatus according to the second exemplary aspect (target/remote device) to select its serving relay device, e.g. by considering alignment of a SL DRX on-period between the apparatus that transmitted the message and the apparatus according to the second exemplary aspect (target/remote device).

According to an exemplary embodiment of the first exemplary aspect, if the message is a retransmission, the SL transmit power for transmitting the message is increased. This may allow to prioritize the message since the transmitted message may be received by one or more relay device candidates located in an increased range. Further, the message may be prioritized so that e.g. the respective first device that may have e.g. waited longer than other devices and requests a relayed communication may be handled with priority by the respective apparatus(es) according to the first exemplary aspect.

According to an exemplary embodiment of all exemplary aspects, the message further comprises a control information indicative of a relay selection factor, RSF, which is adjustable by the apparatus prior to transmitting the message. The performing may be done further based on the control information.

Alternatively, the control information may be received accompanying the message. Thus, the control information may not be comprised or be a part of the message.

Such a control information may enable an explicit mechanism of assisting a/the second (e.g. target/remote device) device in UE-to-UE or UE-to-network relay device selection, in comparison to the implicit mechanism derived from performing SL transmit power adjustment and/or radio resource selection by the respective UE-to-UE or UE-to-network relay device. Further, the explicit mechanism may also comprise performing of e.g. transmit power control and/or radio resource selection by a respective UE-to-UE or UE-to-network relay device candidate prior to transmitting the message. Then, the second device (e.g. target/remote device) may obtain (e.g. receive) the respective message.

Such an explicit mechanism may be based, at least in part, on a Relay Selection Factor (RSF), which may be set and sent along with the message, e.g. by the one or more relay device candidates to the apparatus according to the second exemplary aspect. Such a RSF may assist in UE-to-UE or UE-to-network relay device selection. The RSF may indicate suitability of the respective relay device candidate. Thus, a respective relay device candidate with highest/lowest RSF value may be preferred to be selected by the target device.

The RSF may be set by a respective relay device candidate of the one or more relay device candidates that have obtained (e.g. received) the message. The respective relay device candidate may relay/transmit the message from a/the first device or from other relay device candidates in a similar way, as disclosed above, with the utilization of the RSF. Thus, if RSF is set, the respective relay device candidate can also perform the transmit power adjustment and/or radio resource selection prior to the transmitting the message. The respective relay device candidate may take into account another RSF received along with the message to be transmitted, e.g. stemming from other relay device candidates.

Other conditions or criteria may also be considered, such as semi-static factors such as one or more device capabilities, one or more QoS requirements, one or more dynamic factors such as hop count, power status, radio condition, or a combination thereof, to name but a few non-limiting examples.

The RSF may be realized with, e.g., no more than one octet (e.g. of bits) so that an overhead with regard to the required signaling caused by the RSF is low compared to using a message to list all the relevant information elements.

The RSF may be sent along with the message in either the message, thus being comprised by it, or as a MAC control element (CE) or a SCI, to name but a few non-limiting examples.

In a way, the RSF may be considered to be an explicit representation of an implicit control information that is represented (e.g. embedded) in the adjusted transmit power and/or selected radio resource e.g. in the time-and/or-frequency domain. Thus, the RSF of a relay device candidate may be set based on one or more RSFs of prior-hop relay device candidate(s) which may be received along the message from such prior-hop relay device candidates. The RSF may be used as a metric to reflect the single/multi-hop connectivity condition(s) between the respective relay device candidate and the first device.

Upon receiving the message by the apparatus according to the second exemplary aspect, the apparatus selects the relay device/path.

A respective message may be received from more than one relay device candidates (e.g. apparatuses according to the first exemplary aspect). The message transmitted by more than one relay device candidates may be identifiable based on an identifier (e.g. Layer-1/Layer-2 ID) comprised or represented by the message. Then, the apparatus according to the second exemplary aspect may select a respective relay device to relay its traffic between the first device and the apparatus according to the second exemplary aspect.

If the apparatus can adjust its SL DRX cycle, e.g. to shift/extend its SL DRX on-period to be aligned with a relay device candidate, the relay device candidate with the highest SL-RSRP received from the message may be selected. This may also be applicable, if the apparatus does not apply SL DRX and it may be always active for SL communication, thus, does not enter a sleep mode, to name but one non-limiting example.

According to an exemplary embodiment of the second exemplary aspect, the selecting is further based on a SL-RSRP with which the message is received and/or a time-and/or-frequency radio resource via which the message is received.

Further, the apparatus according to the second exemplary aspect may determine which of the one or more relay device candidates serves as the relay device, e.g. based, at least in part, on whether or not SL DRX can be used. For instance, the message, or another information accompanying the message may further indicate SL DRX information of the apparatus according to the first exemplary aspect (relay device) from which the target/remote device obtains (e.g. receives) the message. The indicated SL DRX information may be used by the second device (e.g. target/remote device) to select the relay device, e.g. by considering the alignment of the SL DRX on-period between the target/remote device and the one or more relay device candidates. Such an adjustment of the transmit power and/or selecting of the radio resource may be performed in the case that the second device (e.g. target/remote device) has no prior-knowledge regarding the SL DRX information of the relay device candidates before the discovery procedure takes place.

For instance, a respective relay device candidate may prioritize to use the time-domain resource or the time-domain resource pool (e.g. in the middle) of its SL DRX on-period. Thus, if other relay device candidates apply the same (pre-) configured SL DRX on-period duration with the same periodicity, the apparatus according to the second exemplary aspect (target device) may determine (e.g. estimate) the SL DRX on-period for each of the relay device candidates (e.g. from which the apparatus has obtained (e.g. received) a respective message) by determining or analyzing the radio resource (e.g. time domain resource) from which the message is obtained. Thus, the apparatus (target device) may select the respective relay device candidate having the best SL DRX on-period alignment Further, a frequency-domain resource may also be used to indicate additional SL DRX related information by a respective relay device candidate to the apparatus (target device). As one example, the respective resource(s) from different frequency-domain resource pools can indicate different duration lengths of the SL-DRX on-period. Based on such information, the apparatus may select a relay devices to serve as a respective relay device between the apparatus and the first device, e.g. in order to maximize the supported data rate.

In case the SL communication between the apparatus and the first device requires multiple (e.g. at least two) relay devices, in this way, a relay path may be selected.

The second device (e.g. target/remote device, apparatus according to the second exemplary aspect) may send a further message (e.g. request accept message) to the selected relay UE, and the relay UE may further transmit the message to the first device (e.g. source UE), possibly through one or more further relay devices. Afterwards, the selected relay UE can be used to transmit (e.g. relay) the traffic between the first and the second devices (e.g. source and target/remote UEs).

According to an exemplary embodiment of the second exemplary aspect, the selecting is further based on a SL-reference signal received power, SL-RSRP, or a SL Reference Signal Received Quality, SL-RSRQ, with which the message is received.

As disclosed above, if the apparatus according to the second exemplary aspect (target device) cannot shift/extend its SL DRX on-period, the apparatus may select among the one or more relay device candidates the respective relay device having the largest alignment of the SL DRX on-period. If there are multiple relay device candidates with the aligned SL DRX on-period, the apparatus may further determine which of those suitable relay device candidates has the highest received SL-RSRP, and/or a highest SL-RSRQ with which the message is received, to name but one non-limiting example.

Also, further information may be available, thus, another option may be to transmit some further (e.g. relevant in this regard) additional information, such as Tx power level at a respective relay device candidate, to the apparatus (e.g. target device). Such information may be transmitted (e.g. explicitly) to the apparatus. Also, such information may be implicitly derived. Then, e.g. the respective Tx power level may be derived from obtained information and/or message(s).

The first device (source device) may initiate the discovery procedure by providing the message (e.g. communication request message) e.g. to one or more relay device candidates that may be suitable and/or can support and/or may have been authorized for relay functionality, and/or are in proximity of the first device. Then, the one or more relay device candidates may transmit the message with a certain and adjusted transmit power and/or via a certain radio resource enabling a selecting of the relay device by the second device/UE (e.g. target/remote device) based at least in part, on the used radio resource(s) for transmitting the message, to name but one non-limiting example.

The message may be transmitted/forwarded by one or more relay device candidates (e.g. apparatus(es) according to the first exemplary aspect) to the second device (e.g. target/remote device, apparatus according to the second exemplary aspect). Such a target/remote device selects among the one or more relay device candidates a respective relay device and provides (e.g. transmits), e.g. via the selected relay device) a further message (e.g. request accept message). Thus, the further message is received by the first device (e.g. source device) so that the first device may know that a SL communication with the second device e.g. via the one or more selected relay devices—as far as necessary—is enabled. Thus, the (e.g. SL) communication can be established.

The apparatus (first device) may control its maximal distance from the one or more relay device candidates. This may be done for the purpose of adjustment, e.g. reduction of its (e.g. SL) transmit power, to name but one non-limiting example. Thus, the apparatus (first device) may indicate its location and the required range to the nearby relay device candidates, e.g. by using sidelink control information (SCI).

Therefore, (e.g. only) the respective relay device candidates with a certain distance (thus, proximity) from the first device that may be smaller than an indicated range (e.g. in the message) can act as a relay device candidate respectively relay device.

Additionally or alternatively, the apparatus according to the first exemplary aspect (relay device candidate) may be configured to (e.g. only) transmit the message to the apparatus according to the second exemplary aspect (target device), e.g. when a SL-RSRP measured on a reference signal received from the first device is above a pre-defined threshold. This may allow to implicitly exclude one or more relay device candidates which are not located close enough to the apparatus (source device).

The first device may determine to provide the (e.g. communication request) message based, at least in part, on one or more of the following:
  at least one certain event;
  obtaining a trigger to provide the communication request message; and
  option to reduce (e.g. SL) transmit power.

There may be one or more different events and/or targets based on which, at least in part, it is determined to provide the message and/or initiate the discovery procedure. Thus, at least one certain event, a triggering to provide the message, an option to reduce SL transmit power may trigger respectively initiate the first device to provide (e.g. send) the message of the discovery procedure. The message, thus, indicates that the apparatus wants or intends to use a relay device to communicate with a second device via a respective SL communication. For instance, such a second device (e.g. target device) may move out of the single-hop reachability of the first device, so that a discovery procedure to discover a path via which communication can be re-established. Thus, a respective message may be provided by the first device to re-establish (in case SL communication was established before) to the second device. Further, such a message may be provided by the apparatus if it determines to save its SL transmit power, as disclosed above, to name but one further non-limiting example.

According to an exemplary embodiment of all exemplary aspects, the first device may further perform:
  monitoring the communication request message procedure between each of the relay device candidates and the target device;
  determining if relay selection procedure (as performed by the apparatus according to the second exemplary aspect) is successful; and
  retransmitting the communication request message based, at least in part, on an outcome of the determining.

The first device (e.g. source device) may monitor its provided (e.g. sent) message respective discovery procedure, e.g. to improve the reachability of the message at the intended target/remote device, thus, the second device. Also, the first device (source device) may monitor the discovery procedure or a message of it to ensure that a SL communication is established, e.g. in case of prioritized data to be transmitted to the second device, to name but one further and non-limiting example. The first device (source device) may monitor/estimate the message between the one or more relay device candidates and the target device.

The first device (source device) may determine to retransmit the message, e.g. if the discovery procedure is likely to fail or has failed e.g. due to a low SL-RSRP received from the message at the first/second device. Further, the respective apparatus (source device) may determine to retransmit the message, e.g. if no further message (e.g. request accept message) from the second device is obtained (e.g. received). For instance, the first device (source device) may consider that no further message from the second device is obtained if the respective further message is not obtained by the first device within a pre-configured or pre-defined time interval for the relay setup. For instance, a timer may be used, e.g. starting from the instant the first device provided (e.g. sends) the message.

If it is determined, that the message of the discovery procedure is or was not successful, the apparatus (source device) may retransmit the message. The retransmitted message may comprise a respective flag indicating to other apparatuses, e.g. one or more apparatuses according to the first exemplary aspect (relay device candidates) that the message is a retransmitted message of the discovery procedure. Alternatively, a respective relay device candidate may self-determine the message is a retransmitted message, e.g. by comparing the contents of two or multiple messages. Upon receiving such a retransmission of the message, a respective relay device candidate may (e.g. as being set up in this way by the configuration) increase its used (e.g. SL) transmit power to transmit the message. This may allow increase the likelihood that the message is received by the second device and that the second device is enabled to select a proper relay device.

The retransmission of the message may be iteratively carried out, until the remote/target UE successfully receives the message from at least one of the relay device candidates. As disclosed above, a flag or binary value indicating a number of retries of retransmission of the respective message may be comprised by the respective retransmitted message. This may allow to increase the SL transmit power at a respective relay device candidate to transmit the message and, therefore, it may ensure that at least the message from the best relay device candidate can be received or detected by the target device for a successful message respectively discovery procedure.

The features and example embodiments described above may equally pertain to the different aspects according to the present invention.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
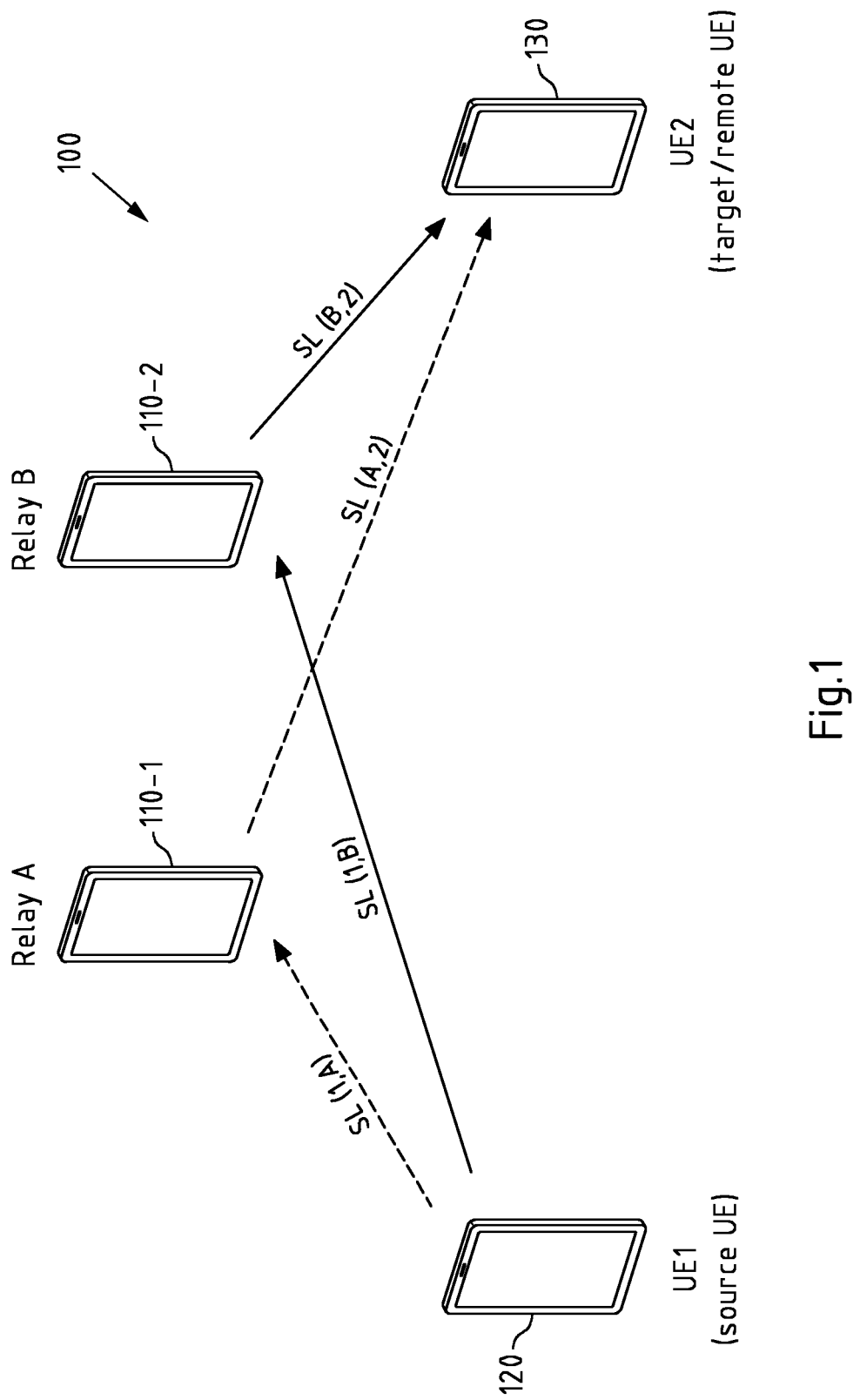
FIG. 1 a schematic block diagram of a system according to an exemplary aspect.

FIG. 1 is an example of a schematic high-level block diagram of a system 100 that is configured to perform and/or control the respective method(s) according to all exemplary aspects.

System 100 may be part of a mobile communication network (not shown in FIG. 1).

System 100 comprises one or more UEs: Relay A UE 110-1, Relay B UE 110-2, UE1 120 and UE2 130. The UEs 110-1 and 110-2 may be relay device candidates which can serve for one or more further UEs (e.g. UEs 120 and 130) as a relay device. The UEs 110-1 and 110-2 may be apparatuses according to the first exemplary aspect. The UE1 120 may be a source UE requesting SL communication. e.g. by transmitting a message (e.g. communication request message of a discovery procedure). The UE2 130 may be a target UE selecting one or more relay devices among the relay device candidates, e.g. among UEs 110-1 and 110-2. The UE2 130 may be an apparatus according to the second exemplary aspect.

Example embodiments enabling respective method(s) according to the first and/or second exemplary aspect may utilize the architecture shown by the system 100 of FIG. 1.

Also, the UE1 120 may transmit a message (e.g. communication request message of a discovery procedure, e.g. SL(1, A) and SL(1,B) messages) which is (are) send e.g. via broadcast/multicast/unicast to Relay A UE 110-1 and to Relay B UE 110-2. The respective Relay A UE 110-1 and Relay B UE 110-2 may transmit the message e.g. to the UE2 130 (SL(A,2) and SL(B,2) message). Upon receiving the message, the Relay A UE 110-1 and to Relay B UE 110-2 perform or apply at least one of an adjustment of a (e.g. SL) transmit power and/or a (e.g. SL) radio resource selection. The UE2 130 may select which of the Relay A UE 110-1 and the Relay B UE 110-2 should serve as a relay device e.g. for a relayed (e.g. SL) communication between UE1 120 and UE2 130. In return, the UE2 130 may provide (e.g. sends or transmits) a request accept message via the selected relay device to the UE1 120.

In one example, in a first step, UE1 120 sends a first message (e.g. a discovery solicitation message) to Relay A UE 110-1 and to Relay B UE 110-2, e.g. in order to discovery the respective relay UE(s) and/or the target UE(s). Upon receiving such a solicitation message by Relay A UE 110-1 and by Relay B UE 110-2, the Relay A UE 110-1 and the Relay B UE 110-2 may send a second message (e.g. a discovery announcement type of message seen from the perspective of UE2 130, but this message may be triggered by receiving the first message from UE1 120) to UE2 130.

As one further example, the Relay A UE 110-1 and/or the Relay B UE 110-2 may send the second message, wherein a condition of a prior-hop can be derived from receiving the first message. Thus, upon UE2 130 receiving the second message from Relay A UE 110-1 and/or the Relay B UE 110-2, it can perform relay selection.

In another example, the above disclosed discovery procedure may be preceded by another announcement message from a relay UE, e.g. Relay A UE 110-1 and/or the Relay B UE 110-2. For instance, as the preceding step, the Relay A UE 110-1 and/or the Relay B UE 110-2 may send a discovery announcement message to indicate its presence as relay device candidate(s). Then, once UE1 120 receives such an announcement message, it may send the first message (i.e. the solicitation message of the previous example), which triggers the Relay A UE 110-1 and/or the Relay B UE 110-2 to further transmit the second message (e.g. the second message (or a discovery announcement type of message) in the previous example). Thus, similar to the previous example, the embodiment(s) may be applied by Relay A UE 110-1 and/or the Relay B UE 110-2 to transmit the second message.

In one further example, the Relay A UE 110-1 and/or the Relay B UE 110-2 may transmit a discovery response type of message. For instance UE2 130 may first transmit a discovery solicitation message to UE1 120 via Relay A UE 110-1 and/or the Relay B UE 110-2. Upon receiving the solicitation message e.g. from both Relay A UE 110-1 and the Relay B UE 110-2, UE1 120 may transmit a response message to UE2 130 via both Relay A UE 110-1 and the Relay B UE 110-2, wherein Relay A UE 110-1 and Relay B UE 110-2 may apply/perform at least one of a transmit power adjusting and/or radio resource selection to transmit the respective response message to UE2 130. The condition of a prior-hop can be derived from the message exchange between Relay A UE 110-1 and/or the Relay B UE 110-2 and UE1 120 e.g. by the UE2 130. In this case, upon UE2 130 receives the response message from Relay A UE 110-1 and the Relay B UE 110-2, so that it can select the proper relay device among those relay device candidates (Relay A UE 110-1 and the Relay B UE 110-2).

Further, there may already be a link established between UE1 120 and the Relay A UE 110-1 and/or the Relay B UE 110-2 and/or the UE2 130 prior to example embodiments according to all exemplary aspects being performed and/or controlled by the respective UEs. For instance, the above disclosed discovery procedure may take place (e.g. only) by transmitting message(s) between Relay A UE 110-1 and/or Relay B UE 110-2 and UE2 130. In this case, a legacy discovery procedure (e.g. model A or B, e.g. shown in FIGS. 8*a* and 8*b*) for UE-to-Network relay can be reused for exchanging message(s) between Relay A UE 110-1 and/or the Relay B UE 110-2 and UE2 130. Thus, Relay A UE 110-1 and/or the Relay B UE 110-2 may send such a discovery announcement/response message, where the condition(s) of the link (already established, as disclosed above) can be derived directly from the ongoing communication over the link.

Figure 2:
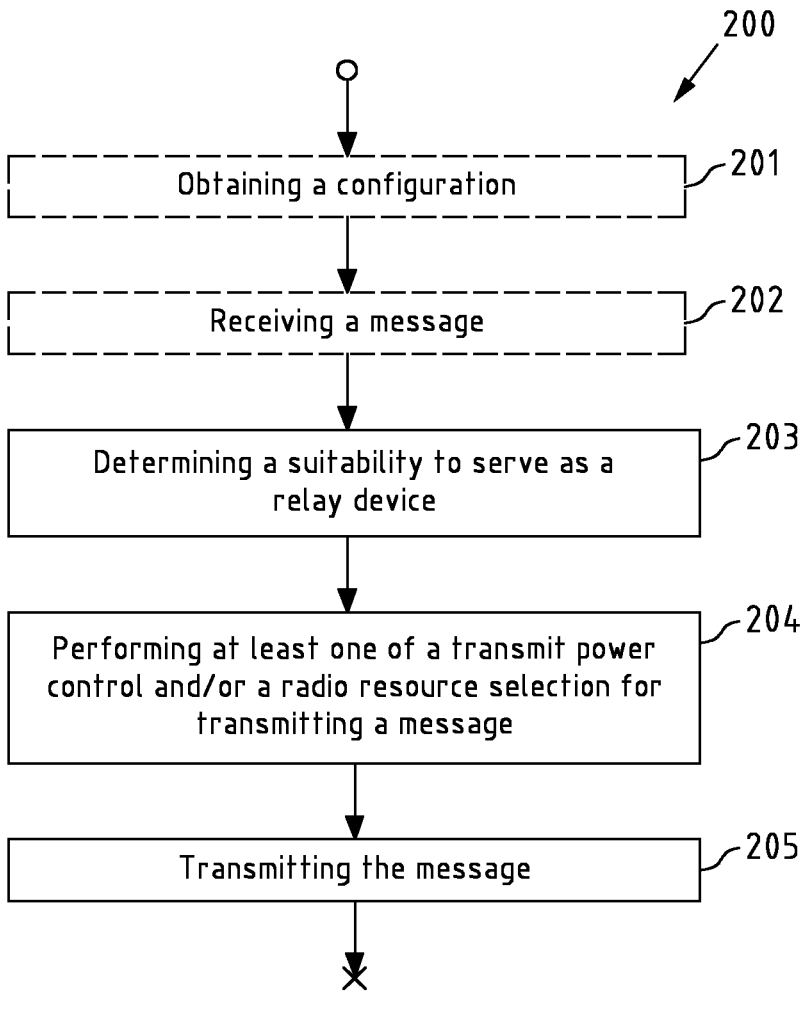
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a relay device respective relay device candidate, e.g. Relay A UE 110-1 and/or Relay B UE 110-2 of FIG. 1.

In an optional first step 201, a configuration is obtained, e.g. by receiving the configuration, e.g. from a mobile communication network. Alternatively, such a configuration may be received via a relayed configuration from one or more other devices, e.g. in the proximity of the respective relay device candidate. Also, the configuration may be obtained, e.g. by retrieving the configuration from a memory. In this latter case, the configuration may be provided (e.g. stored) into the memory prior to the relay device respectively relay device candidate performing and/or controlling the flowchart 200, e.g. during manufacturing to name but one non-limiting example.

In an optional second step 202, a message is received. The message may for instance be received via a communication connection established between the relay device candidate respective relay device and a first device. The message may be a message of a discovery procedure, e.g. a communication request message, to name but one non-limiting example. With such a message, a request for a relayed communication may be obtained.

In a third step 203, a suitability to serve as a relay device for a relayed communication is determined. For instance, relaying load of one or more other SL communication the relay device candidate performing and/or controlling the flowchart 200 may have, may be assessed, to name but one non-limiting example. Further examples are disclosed in this specification, e.g. above in the summary section.

In a fourth step 204, at least one of a (e.g. SL) transmit power adjustment and/or (e.g. SL) radio resource selection (e.g. indicative of a time-and/or-frequency resource) for transmitting the message (e.g. see optional step 202) is performed. By the performing, the message may be transmitted with an adjusted (e.g. SL) transmit power and/or via a certain time-and/or-frequency (e.g. SL) radio resource enabling a recipient (the second device, e.g. a target/remote device performing the flowchart 300 of FIG. 3) to implicitly assess and/or select a most suitable relay device among one or more relay device candidates.

In a sixth step 206, the message is transmitted (e.g. forwarded in case optional step 202 is performed) correspondingly with the (e.g. SL) transmit power adjusted and/or via the (e.g. SL) radio resource selected as an outcome of the performing. The message may be transmitted to one or more further relay device candidates performing and/or controlling the flowchart 200, and/or to an intended target/remote device, e.g. performing and/or controlling the flowchart 300 of FIG. 3.

Figure 3:
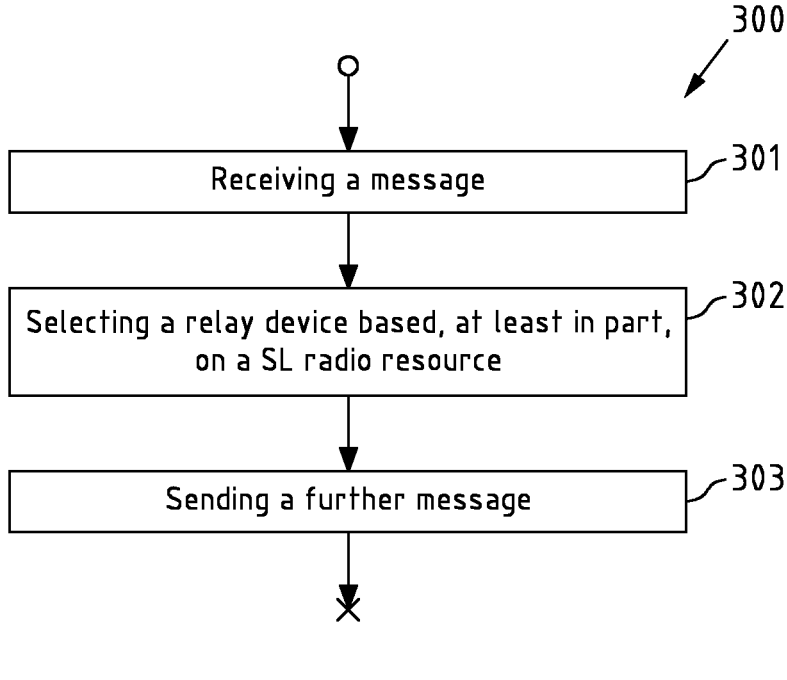
FIG. 3 a flowchart showing an example embodiment of a method according to the second exemplary aspect.

FIG. 3 is a flowchart 300 showing an example embodiment of a method according to the second exemplary aspect. This flowchart 300 may for instance be performed by a target or remote device, e.g. UE2 130 of FIG. 1.

In a first step 301, a message is received. The message may be received from one or more relay device candidates (e.g. performing and/or controlling the flowchart 200 of FIG. 2). The message may be received from a mobile communication network, e.g. a base station (e.g. gNB) serving the apparatus performing and/or controlling flowchart 300. The message is received with e.g. a certain (e.g. SL) reference signal received power/quality and/or via a certain (e.g. SL) radio resource (e.g. in a certain time-and/or-frequency domain) based on which the selecting of one or more relay device among those devices from which the respective message(s) is (are) received, may be performed.

In a second step 302, a relay device is selected based, at least in part, on a SL radio resource. The relay device may enable relaying of data via a SL communication between the first device e.g. transmitting a message (e.g. discovery message or a communication request message) e.g. for initiating a relay SL communication with another device, and the apparatus performing and/or controlling flowchart 300. The selecting may be based on the SL radio resource to enable choosing a proper relay device.

In a third step 303, a further message is sent, e.g. in response to the received message of step 301. The further message may be a request accept message. With the further message, e.g. acknowledging the SL communication with a source device (e.g. UE1 120 of FIG. 1) is enabled, e.g. by sending such an acknowledgement message. In particular, the further message may be sent via the selected one or more relay devices (see step 302) to the first/source device which initially a message (e.g. a discovery message or a communication request message) was provided. In one example, upon the target/remote device having selected the relay device among the one or more relay device candidates, the target/remote device may initiate the data transmission to the first device (e.g. source device) via the selected relay device. Thus, the first device may know (implicitly) the selected relay device by receiving the data from the respective target/remote device via the selected relay device. In this case, step 303 may be optional. Further, in this latter case, step 303 may not be required to be performed.

Figure 4:
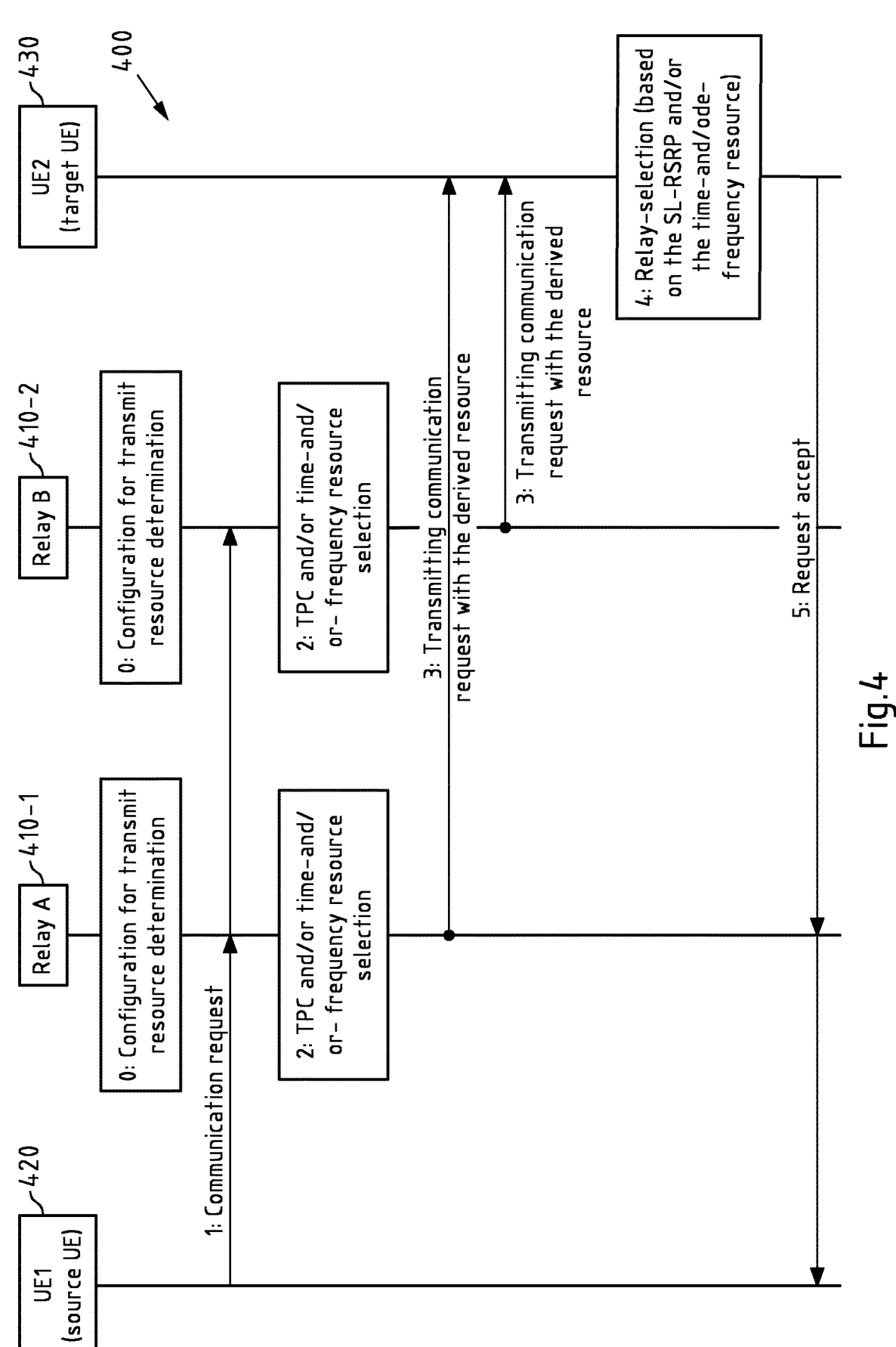
FIG. 4 a flowchart showing an example embodiment of a system according to an exemplary aspect of a UE-to-UE relaying.
Figure 5:
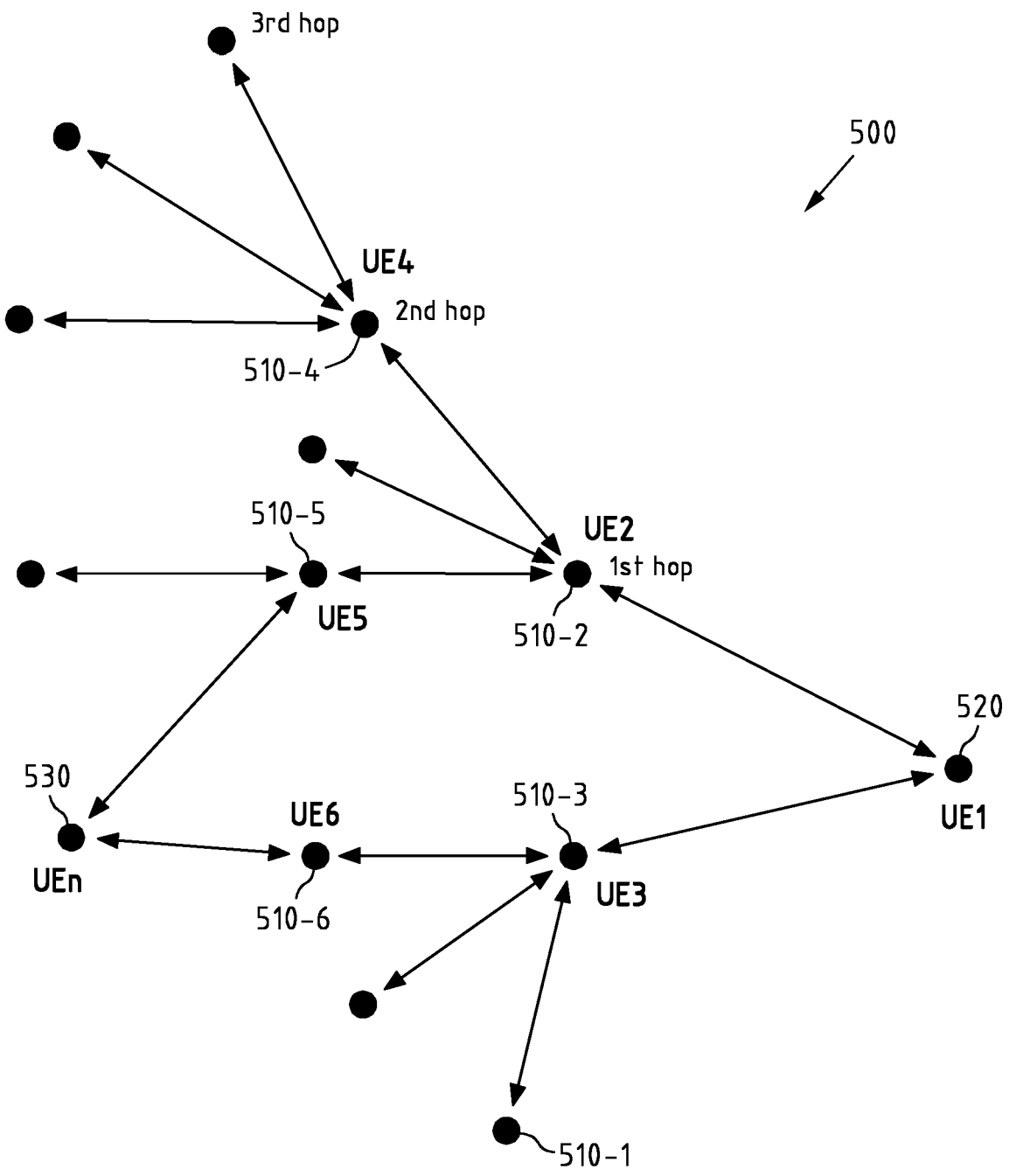
FIG. 5 an example of a point-to-multi-point SL communication, as utilized by example embodiments of all exemplary aspect.

FIG. 4 shows a flowchart showing an example embodiment of a system 400 according to an exemplary aspect of a UE-to-UE relaying. FIG. 5 shows a signaling taking place between a UE1 (source UE) 420, two relay device candidates (Relay A 410-1 and Relay B 410-2), and a UE2 (target UE) 530.

In a step 0, a respective UE-to-UE relay, is provisioned with the configuration to forward the communication request message, e.g. with the SL transmit power adjustment, and/or the (e.g. time-and/or-frequency) radio resource selection, which will be carried out in the next steps. Here, Relay A 410-1 and Relay B 410-2 are provisioned with the configuration (also see step 201 of FIG. 2).

For instance, the configuration at the respective Relay A 410-1 and Relay B 410-2 may include or comprise certain services (e.g. Internet-of-Things (IoT)/Industrial IoT (IIoT) services) and/or scenarios (e.g. in static/semi-static mobility scenario), where the proposed SL transmit power adjustment (e.g. control) and/or the radio resource selection can be applied, e.g. are allowed to be applied by the Relay A 410-1 and Relay B 410-2 prior to forwarding a respective communication request message received from UE1 420.

In a step 1, the source UE (UE1 420) may transmit a communication request message to the UE-to-UE relay candidates (i.e. the UEs that can support and have been authorized for relay functionality, e.g. Relay A 410-1 and Relay B 410-2) in its proximity (see step 202 of FIG. 2).

In a step 2, upon receiving the communication request message, each relay candidate (Relay A 410-1 and Relay B 410-2 in FIG. 4) checks if it can act as the relay for the received communication request and determines its suitability to act as a relay (see step 203 of FIG. 2).

It may check if it is located with the range indicated by the source UE (UE1 420), or it may check a SL-RSRP received from the communication request message. It may further check if a respective service/application/group identifier carried in the communication request message is included in the configured services of the configuration e.g. to perform the proposed SL transmit power adjustment and/or the time-and/or-frequency resource selection (see step 204 of FIG. 2).

If a respective outcome of the above disclosed determining (e.g. check) is positive e.g. for both Relay A 410-1 and Relay B 410-2, as shown in FIG. 4, they will perform the proposed transmit power adjustment and/or the time-and/or-frequency radio resource selection to transmit the message to the target UE by using the provisioned configuration (it is noted that the configuration is provisioned in step 0 but executed respectively applied as disclosed here).

In a step 3, the determined resource(s) (e.g. with an adjusted (e.g. SL) transmit power, and/or time-and/or-frequency resource) from step 2 is (are) used to transmit the message to the target/remote UE (see step 205 of FIG. 2).

In a step 4, upon receiving the message, the target/remote UE (UE2 430) selects the relay (see step 302 of FIG. 3).

If the UE2 430 can adjust its SL DRX cycle, e.g. to shift/extend its SL DRX on-period to be aligned with the selected UE-to-UE relay (Relay A 410-1 and Relay B 410-2), the respective UE-to-UE relay with the highest SL-RSRP received from the message can be selected. This approach may be applicable, e.g. if the UE2 430 does not apply SL DRX and it is always active for SL communication.

Step 5

The target/remote UE (UE2 430) may send a further message (e.g. request accept message, see step 303 of FIG. 3) to the selected relay UE (Relay A 410-1 and/or Relay B 410-2), and the respective relay UE may forward the request accept message to the source UE (UE1 420). Afterwards, the selected relay UE ((Relay A 410-1 and Relay B 410-2) can be used to forward the traffic between the source UE (UE1 420) and the target UE(s), here UE2 430. Alternatively, the target/remote device/UE may use the selected relay device/UE to communicate with the first device (e.g. source UE) already in step 5.

FIG. 5 shows an example of a point-to-multi-point SL communication, as utilized by example embodiments of all exemplary aspect.

One or multiple relevant aspect(s) may be configured with multiple weights to derive a respective SL transmit power at the UE-to-UE relay device candidate for forwarding the communication request message. The UE-to-UE relay device candidate may select the proper weight to derive the SL transmit power based on at least one of the following conditions:

The UE-to-UE relay device candidate may consider its hop index/number. The UE-to-UE relay device candidate may be used to facilitate point-to-multi-points (P2MP) communication in a multi-hop scenario, as shown in FIG. 5. A respective relay device candidate may use a different weight by considering its hop positioning in the communication chain. As one example, UE2 510-2 and UE3 510-3 (as the first hop relay transmitter) in FIG. 5 may apply a higher weight than UE4 510-4 and UE5 510-5 (as they would be second hop relay transmitter) for the same aspect. This may allow that relevant aspect(s) at the respective node(s) represented by the UEs with lower hop index gets higher weight(s), e.g. the selection at the target UE (e.g. UE n 530) may prefer to consider the energy consumption at UE2 510-2 and UE3 510-3 compared to that at UE4 510-4 and UE5 510-5, since UE2 510-2 and UE3 510-3 may serve more UEs (not referenced with a reference sign in FIG. 5). Also, their respective power consumption at UE2 510-2 and UE3 510-3 may be considered with priority. Thus, for example, if UE2 510-2 and UE6 510-6 have less energy constraint (e.g. with a larger battery capacity), but not UE3 510-3 and UE5 510-5, the performed transmit power adjustment and/or radio resource selection may be set (e.g. via the provided configuration) to enable the target UE, UE n 530 to select a respective relay path over or via UE2 510-2 and UE5 510-5, instead of a path via UE3 510-3 and UE6 510-6, given that all other aspects/conditions over the different hop index/number may have the same weight to derive SL transmit power control, e.g. by considering the energy constraint, target UE n 530 may experience the same SL-RSRP from the two different paths. In this latter case, different hops represented by different relay device candidates may apply the same weight.

Figure 6:
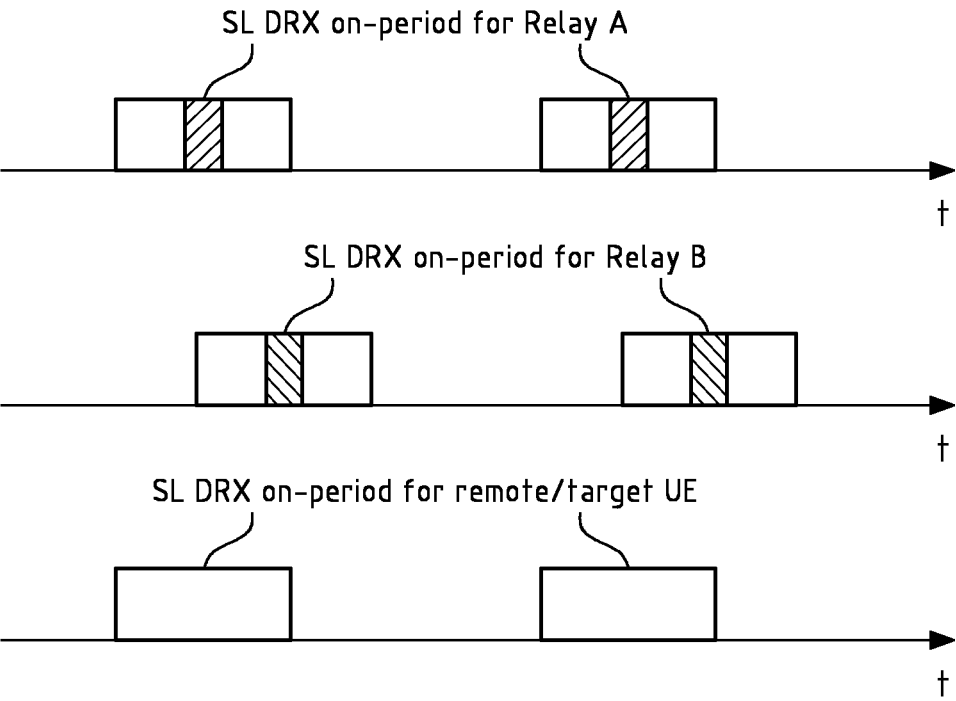
FIG. 6 an illustration of considering SL DRX information for selecting a relay device, as utilized by example embodiments of all exemplary aspect.

FIG. 6 shows an illustration of considering SL DRX information for selecting a relay device, as utilized by example embodiments of all exemplary aspect. An example of using time-domain transmit resource to select the relay device with a good alignment for SL DRX on-period is shown. A target device may have a better alignment with Relay device A than with Relay device B, as shown in FIG. 6.

For instance, if the target UE cannot shift/extend its SL DRX on-period, the target/remote UE may select the relay UE with the largest alignment of the SL DRX on-period. If there are multiple UE-to-UE relays with the aligned SL DRX on-period, the target/remote UE may further select the relay UE with the highest received SL-RSRP.

Figure 7:
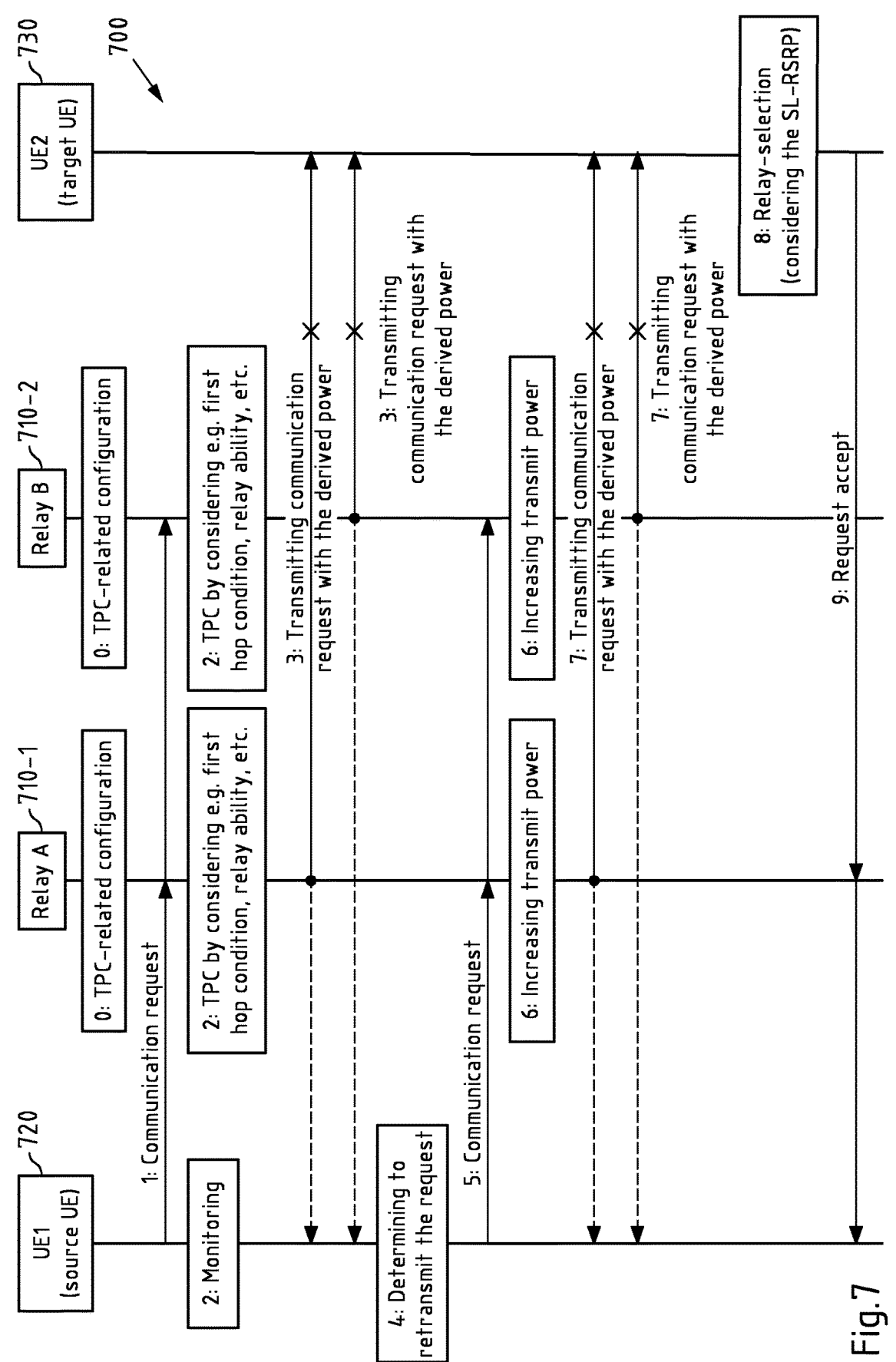
FIG. 7 another flowchart showing an example embodiment of a system according to an exemplary aspect.

FIG. 7 shows another flowchart showing an example embodiment of a system according to an exemplary aspect. FIG. 7 shows how a reachability enhancement for a SL transmit power adjustment at a respective UE-to-UE relay device candidate can be applied. For instance, a respective relay device candidate can increase its SL transmit power by receiving a retransmission of a communication request message.

The system 700 comprises a source UE, UE1 720, two relay device candidates (Relay A 710-1, and Relay B 710-2), and a target UE, UE2 730.

If a respective SL transmit power of the relay device candidates 710-1, 710-2 is low, there is a chance that a communication request message (see step 1) from none of the relay device candidates can be detected/received by the target device 730, e.g. due to a low SL-RSRP received by the target device 730. This may lead to an outcome of such an initiated communication request procedure to fail, as the target device 730 is not enabled to select any relay device. To address this, in order to ensure a good reachability of a communication request procedure for the performing of the transmit power adjustment and/or radio resource selection, in particular the SL transmit power adjustment such that at least the communication request message from the (e.g. best or most suitable) relay device candidate (e.g. Relay A 710-1) can be successfully detected or received by the target device 730, the source device 720 may be triggered to perform a retransmission of the communication request message. The retransmission would trigger (e.g. all) respective the relay device candidates 710-1, 710-2 to increase their respective SL transmit power e.g. with a configured offset for forwarding the communication request message. This is shown in FIG. 7.

In the following, FIG. 7 is described with a focus on the differences compared with the system 400 shown in FIG. 4. In addition, since the to-be-addressed problem is introduced by SL transmit power control at the respective relay device candidate(s) (e.g. Relay A 710-1, and Relay B 710-2), the following disclosure is focused on a respective SL transmit power adjustment. However, it will be understood that a respective (e.g. time-and/or-frequency) radio resource selection scheme/procedure e.g. to indicate SL DRX information is not affected.

After transmitting the communication request message in step 1 to the relay device candidates 710-1, 710-2, the source device (UE1) 720 may monitor the communication request message procedure between (e.g. each of) the relay device candidates 710-1, 710-2 and the target device (UE2) 730. This may be done e.g. in order to determine/estimate if the communication request message procedure is successful. For example, the source device 720 may apply at least some of the example embodiments disclosed in the following.

For instance, if UE1 720 does not receive a request accept message from any of the UE-to-UE relay device candidates 710-1, 710-2 in response to its provided communication request message, in a configured timer, it may consider the communication request procedure to be not successful.

Additionally or alternatively, if the UE1 720 assigns a SL resource for the a respective UE-to-UE relay device candidate 710-1, 710-2 to forward the request accept message from the UE2 730 to the UE1 720, the UE1 720 may also consider the communication request message procedure as failed if the UE1 720 does not detect/receive such a request accept message from the (e.g. assigned) SL resource.

In another example embodiment, if the UE-to-UE relay device candidates 710-1, 710-2 indicate their respective location (e.g. via a location information (e.g. in their forwarded communication request message)), the UE2 730 may determiner (e.g. derive) its distance from the respective UE-to-UE relay device candidates 710-1, 710-2. The derived distance may further lead to an estimated pathloss, which is determinable based, at least in part, on the distance respectively location information. Thus, based on the derived distance and the detected SL-RSRP from the communication request message (e.g. as monitored in step 3), the UE1 720 may determine (e.g. estimate) the SL transmit power at a respective UE-to-UE relay device candidate 710-1, 720-2, e.g. at each of the relay device candidate 710-1, 710-2. If e.g. all the relay device candidates 710-1, 710-2 transmit with low power, it may be likely that the communication request message may not be detectable or receivable by the remote device, UE2 730. Then, the example as disclosed may be applied in the case that the source device (UE1 720) may be aware that the target device (UE2 730) may be located (e.g. too) far away.

The source device (UE1 720) may determine to retransmit the communication request message in step 4, e.g. if the communication request message procedure is determined as failed in the last step. Thus, upon receiving a retransmission of the same communication request message as before, a respective relay device candidate 710-1, 710-2, e.g. each of the relay device candidate 710-1, 710-2 may determine to increase its SL transmit power (e.g. performing transmit power adjustment and/or radio resource selection as disclosed in addition or as a part of it) to forward the communication request message e.g. with an offset.

The offset can be (pre-) configured, e.g. by a mobile communication network. Also, the offset may be (pre-) configured in UE-implementation, or in according to a technical specification of a mobile communication standard, to name but a few non-limiting examples. Additionally or alternatively, the source device (UE1 720) may configure and indicate the offset by itself, e.g. the respective offset to be increased e.g. comprised or represented in the communication request message, such that the respective relay device candidates 710-1, 710-2 may follow the offset as a command received from the source device (UE1 720; communication request message of step 5).

The retransmission of the communication request message may be iteratively carried out, until the target device (UE2 730) successfully receives the communication request message from at least one of the relay device candidates 710-1, 710-2, see step 7. This may enable to increase e.g. the respective SL transmit power at (e.g. each of) the relay device candidates 710-1, 710-2 to forward the communication request message and, therefore, it may ensure that at least the communication request message from the best relay device candidate (see step 8) can be detected by the target device (UE2 730) and selected accordingly. For a successful communication request procedure, the target device (UE2 730) transmits in step 9 a request accept message or a data back to the source device (UE1 720), via the selected relay device 710-1.

An identifier may be used to identify the same communication request message from different transmissions/receptions by relay device candidates 710-1, 710-2 and/or the target device (UE2 730).

FIG. 8_a_ shows a respective flowchart of an example embodiment of a system 800_a_ according to an exemplary aspect enabling a UE-to-network relaying.

FIG. 8_b_ shows a respective flowchart of another example embodiment of a system 800_b_ according to an exemplary aspect of a UE-to-network relaying.

Both systems 800_a_ and 800_b_ of FIGS. 8_a_ and 8_b_ show respective discovery procedures, as supported by 3GPP standardization.

System 800_a_ shows a discovery procedure for direct discovery using a single discovery message, referred to as announcement respectively announcement message.

In a first step, the UE-to-Network Relay 820_a_-1 (e.g. a gNB) sends a UE-to-Network Relay Discovery Announcement message to a remote UE, e.g. UE-2 810_a_-2.

In case there are multiple UE-to-Network relays (e.g. corresponding to UE-1 820_a_-1 of FIG. 8_a_) sending a respective discovery announcement message, a respective remote UE selects the relay UE, which may have the best PC5 link quality among all suitable UE-to-Network Relays.

Therefore, as one example, the performing of at least one of a transmit power adjustment and/or radio resource selection may be applied for a relay device candidate (e.g. corresponding to UE-1 820a-1 of FIG. 8a) e.g. to determine its transmit power and/or (e.g. SL) radio resource to send the announcement message to the remote UE. Then, the remote UE may select the most proper relay UE for UE-to-Network relay communication among the relay device candidates from which it has received the respective message.

System 800b shows a discovery procedure for direct discovery using two discovery messages, referred to as solicitation and response messages.

The remote UE, UE-1 820b-1 (discoverer) sends a UE-to-Network Relay Discovery Solicitation message.

The UE-to-Network relays (e.g. one of the UE-2 810b-2, UE-3 810b-3, UE-4 810b-4, and/or UE-5 810b-5, discoverees) that can provide the requested relay services respond to the Remote UE-1 820b-1 with a UE-to-Network Relay Discovery Response message (step 2a performed by UE-2 810b-2 respectively step 2b performed by UE-3 810b-3). The other UEs, UE-4 810b-4, and/or UE-5 810b-5 may not respond to the solicitation message send by UE-1 820b-1.

Figures 8A, 8B:
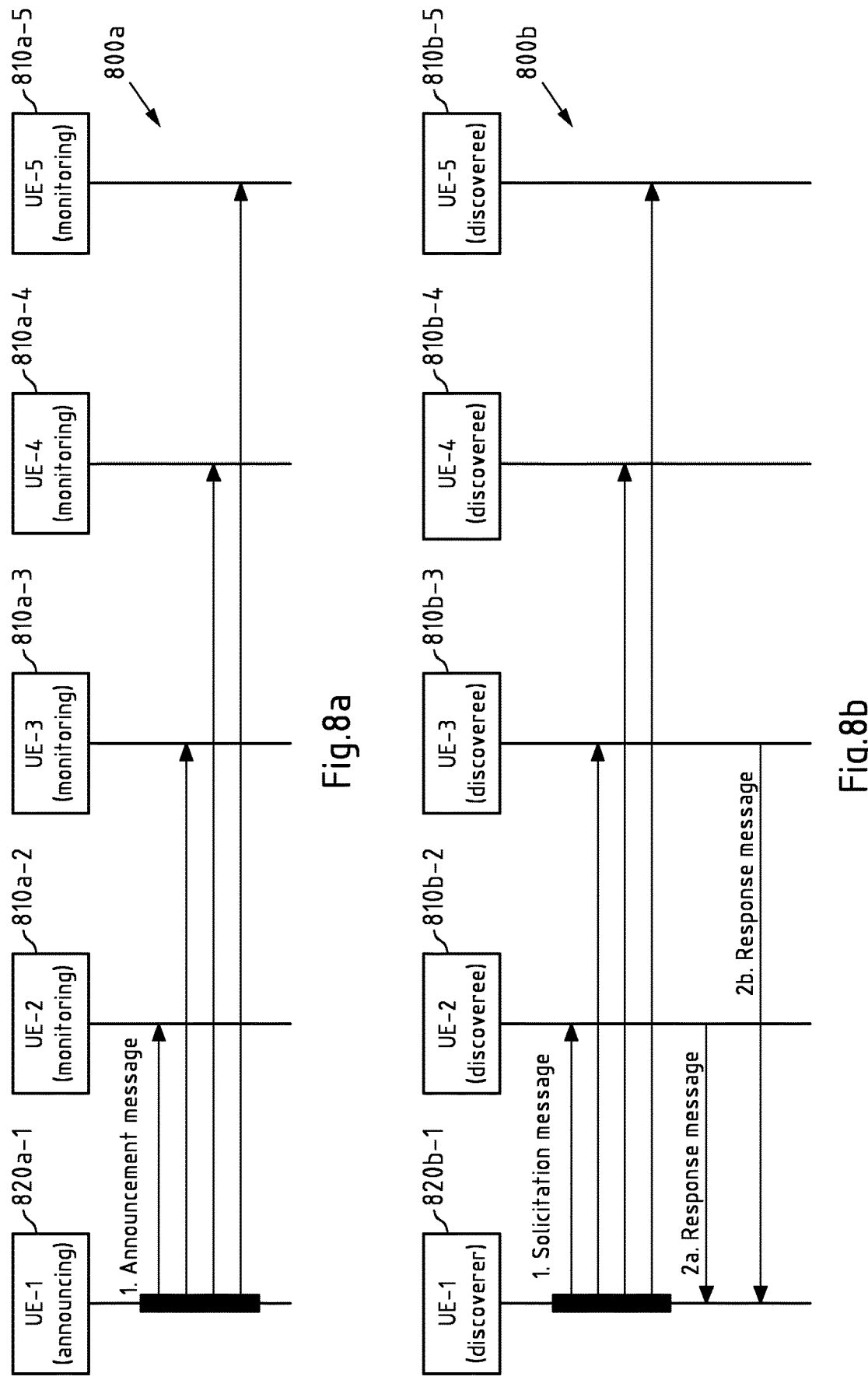
FIG. 8a, 8b show respective flowcharts of an example embodiment of a system according to an exemplary aspect of a UE-to-NW relaying.

In case there are multiple relay devices responding with their UE-to-Network Relay Discovery Response messages, as done/shown in FIG. 8b by UE-2 810b-2 and by UE-3 810b-3, the respective target/remote UE (not shown in FIG. 8b) selects the relay UE, which may have the best PC5 link quality among all suitable UE-to-Network Relays (here UE-2 810b-2 and UE-3 810b-3 that have responded by sending the response message).

Therefore, as one example, the performing of at least one of a transmit power adjustment and/or radio resource selection may be applied for a respective relay device candidate to determine the transmit power and/or (e.g. SL) radio resources to send a respective discovery response message to the remote UE. Then, the remote UE may select the most proper relay UE for UE-to-Network relay communication, accordingly.

In both FIG. 8a and FIG. 8b, a relay device candidate may derive radio condition(s) with its serving/camping network node (e.g. base station) based on the ongoing communication. For instance, such ongoing communication may be if the relay device candidate is in RRC-Connected state and/or be based, at least in part, on downlink (DL) reference signal(s), e.g. if the relay device candidate is in RRC-Inactive/idle state. The derived radio condition(s) may be used by the relay device candidate to perform at least one of a transmit power adjustment and/or radio resource selection for transmitting the discovery announcement and/or response message.

Figure 9:
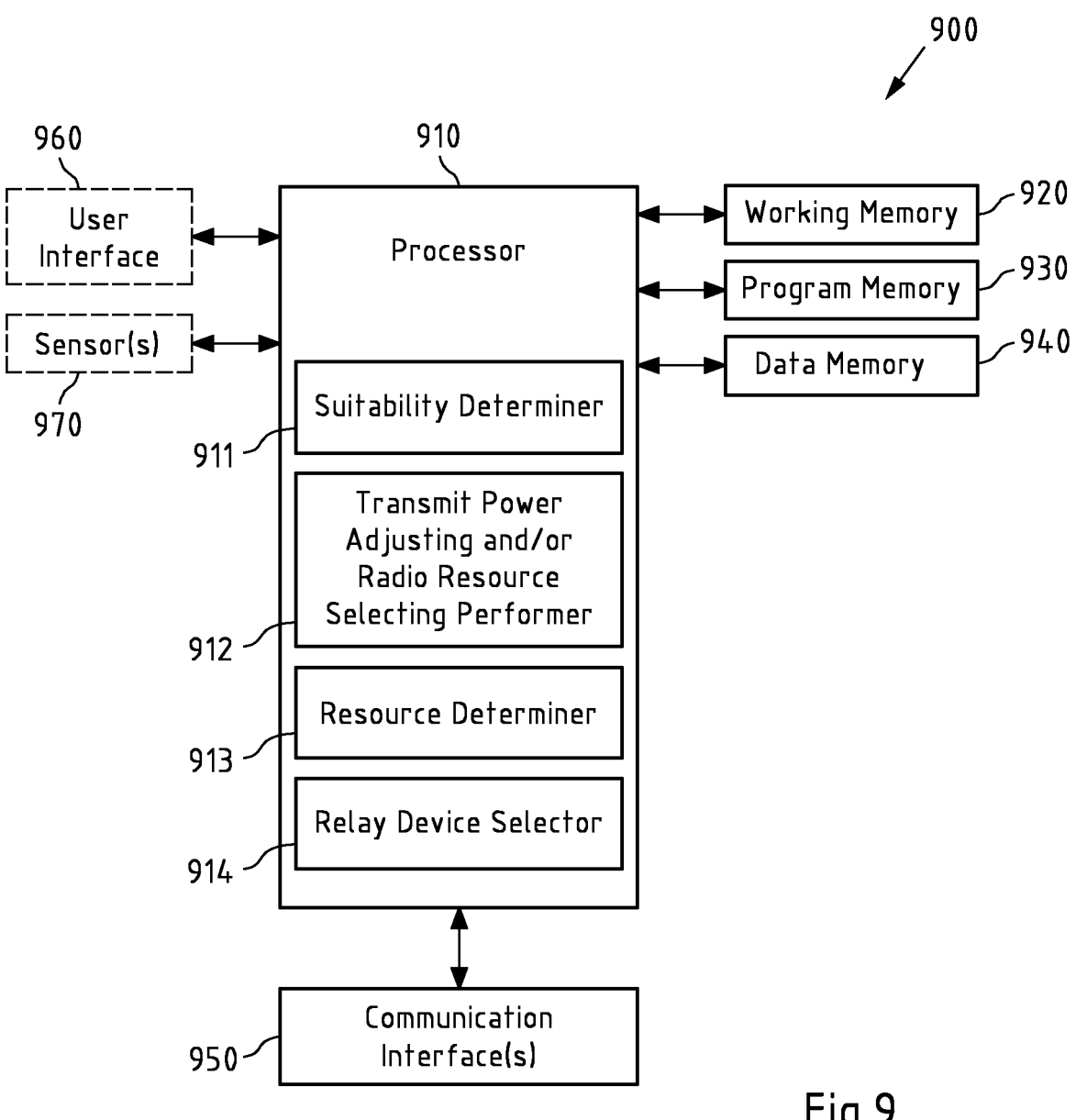
FIG. 9 a schematic block diagram of an apparatus configured to perform the method according to the first and/or second exemplary aspect.

FIG. 9 is a schematic block diagram of an apparatus 900 according to an exemplary aspect. Apparatus 900 may for instance represent an apparatus according to the first exemplary aspect, e.g. a relay device respectively relay device candidate, e.g. Relay A UE 110-1 and/or Relay B UE 110-2 of FIG. 1. Alternatively, the apparatus 900 may for instance represent an apparatus according to the second exemplary aspect, e.g. a target respectively remote device, e.g. UE2 130 of FIG. 1.

Apparatus 900 comprises a processor 910, working memory 920, program memory 930, data memory 940, communication interface(s) 950, an optional user interface 960 and an optional sensor(s) 970.

Apparatus 900 may for instance be configured to perform and/or control or comprise respective means (at least one of 910 to 970) for performing and/or controlling the method according to the first, or second exemplary aspect. Apparatus

900 may as well constitute an apparatus comprising at least one processor (910) and at least one memory (920) including computer program code, the at least one memory and the computer program code configured to, with the at least one processor, cause an apparatus, e.g. apparatus 900 at least to perform and/or control the method according to the first, or second exemplary aspect.

Processor 910 may for instance comprise a suitability determiner 911 as a functional and/or structural unit. Suitability determiner 911 may for instance be configured to determine a suitability of a UE for serving as a respective relay device (see step 203 of FIG. 2).

Processor 910 may for instance comprise a transmit power adjusting and/or radio resource selecting performer 912 as a functional and/or structural unit. Transmit power adjusting and/or radio resource selecting performer 912 may for instance be configured to perform at least one of a transmit power control and/or a radio resource selection for transmitting a message (see step 204 of FIG. 2).

Processor 910 may for instance comprise a resource determiner 913 as a functional and/or structural unit. Resource determiner 913 may for instance be configured to determine one or more resources for transmitting a message (see step 205 of FIG. 2).

Processor 910 may for instance comprise a relay device selector 914 as a functional and/or structural unit. Relay device selector 914 may for instance be configured to select one or more relay devices among a plurality (e.g. at least two) of relay device candidates (see step 302 of FIG. 3).

Processor 910 may for instance further control the memories 920 to 940, the communication interface(s) 950, the optional user interface 960 and the optional sensor(s) 970.

Functional and/or structural units 911 to 913 may for instance be comprised by apparatus 900 if apparatus 900 represents the apparatus according to the first exemplary aspect. Functional and/or structural unit 914 may for instance be comprised by apparatus 900 if apparatus 900 represents the apparatus according to the second exemplary aspect.

Processor 910 may for instance execute computer program code stored in program memory 930, which may for instance represent a computer readable storage medium comprising program code that, when executed by processor 910, causes the processor 910 to perform the method according to the first, or second exemplary aspect.

Processor 910 (and also any other processor mentioned in this specification) may be a processor of any suitable type. Processor 910 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 910 may for instance be an application processor that runs an operating system.

Program memory 930 may also be included into processor 910. This memory may for instance be fixedly connected to processor 910, or be at least partially removable from processor 910, for instance in the form of a memory card or stick. Program memory 930 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 930 may also comprise an operating system for processor 910. Program memory 930 may also comprise a firmware for apparatus 900.

Apparatus 900 comprises a working memory 920, for instance in the form of a volatile memory. It may for instance be a Random Access Memory (RAM) or Dynamic RAM (DRAM), to give but a few non-limiting examples. It may for instance be used by processor 910 when executing an operating system and/or computer program.

Data memory 940 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 940 may for instance store one or more (e.g. communication request) messages, one or more suitabilities to serve as a relay device respective relay device candidate, one or more configurations, one or more (e.g. time-and/or-frequency) radio resources for transmitting (e.g. forwarding) a message, one or more selected relay devices, one or more further (e.g. request accept) messages, or a combination thereof, to name but a few non-limiting examples.

Communication interface(s) 950 enable apparatus 900 to communicate with other entities, e.g. with one or more relay devices, one or more source devices, and/or one or more target devices, e.g. dependent upon whether the apparatus 900 represents an apparatus according to the first, or second exemplary aspect. The communication interface(s) 950 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 900 to communicate with other entities, for instance with one or more base stations of a mobile communication network.

User interface 960 is optional and may comprise a display for displaying information to a user and/or an input device (e.g. a keyboard, keypad, touchpad, mouse, etc.) for receiving information from a user.

Sensor(s) 970 are optional and may for instance comprise a barometric sensor, e.g. to gather pressure information.

Some or all of the components of the apparatus 900 may for instance be connected via a bus. Some or all of the components of the apparatus 900 may for instance be combined into one or more modules.

The following embodiments shall also be considered to be disclosed:

Embodiment 1

A method, comprising:
  determining a suitability to serve as a relay device for a relayed communication between a first device and a second device via one or more relay devices to be selected among one or more relay device candidates;
  transmitting a message as part of a relay discovery procedure, and with the apparatus acting as one of the one or more relay device candidates; and
  performing at least one of a transmit power adjustment and/or a radio resource selection for transmitting the message based, at least in part, on the determined suitability.

Embodiment 2

The method according to embodiment 1, further comprising:
  obtaining a configuration for the performing.

Embodiment 3

The method according to embodiment 2, wherein the suitability is determined based on whether at least one service is to be provided via the relayed communication.

Embodiment 4

The method according to any of the preceding embodiments, wherein the suitability is further determined based on a range between the apparatus and a prior-hop device along a discovery path from the first device to the second device through the apparatus, and/or a Reference Signal Received Power, RSRP of a reference signal transmitted by the prior-hop device, and/or a Reference Signal Received Quality, RSRQ of a reference signal transmitted by the prior-hop device.

Embodiment 5

The method according to any of the preceding embodiments, wherein the first device is a base station of a mobile communication network, and the second device is a User Equipment, UE, the relayed communication is a UE-to-network relayed communication, and the message is an announcement message for a UE-to-network relaying.

Embodiment 6

The method according to any of the embodiments 1 to 4, wherein the first device and the second device are User Equipment, UE, the relayed communication is a relayed sidelink, SL, UE-to-UE communication, the method further comprising:
  receiving a prior message as part of the relay discovery procedure, wherein the message is transmitted responsive to receiving the prior message.

Embodiment 7

The method according to any of the preceding embodiments, wherein the performing is based on at least one weighted criterion.

Embodiment 8

The method according to embodiment 7, wherein the at least one weighted criterion is at least one of the following:
  a condition of a prior hop along a discovery path from the first device to the second device through the apparatus;
  a resource availability;
  a resource stability;
  a relaying load of the apparatus; and
  one or more Quality of Service, QoS, requirements of at least one service to be provided via the relayed communication.

Embodiment 10

The method according to any of the embodiments 7 to 9, wherein a respective weight of the at least one weighted criterion is selected based on at least one of the following conditions:
  considering a reason for establishing the relayed communication; and considering a hop index of the apparatus along a discovery path from the first device to the second device through the apparatus.

Embodiment 11

The method according to any of the preceding embodiments, wherein the radio resource via which the message is transmitted indicates SL Discontinuous Reception, DRX, information associated with the apparatus.

Embodiment 12

The method according to any of the preceding embodiments, wherein the message further comprises control information indicative of a relay selection factor, RSF, which is adjustable by the apparatus prior to transmitting the message.

Embodiment 13

A method, comprising:

receiving a message as part of a relay discovery procedure for a relayed communication between a first device and the apparatus via one or more relay devices to be selected among one or more relay device candidates, wherein the message is received via a certain SL radio resource;

selecting a relay device based, at least in part, on the SL radio resource through which the message is received; and sending a further message (e.g. request accept message or a transmission) enabling the relayed communication towards the first device via the selected relay device.

Embodiment 14

The method according to embodiment 13, wherein the selecting is further based on a SL-reference signal received power, SL-RSRP, or a SL Reference Signal Received Quality, SL-RSRQ, with which the message is received.

Embodiment 15

The method according to embodiment 13 or embodiment 14, wherein the selecting is further based on a SL DRX configuration of the one or more relay device candidates, and/or a SL DRX configuration of the apparatus.

Embodiment 16

An apparatus configured to perform and/or control or comprising respective means for performing and/or controlling the method of any of the embodiments 1 to 12.

Embodiment 17

An apparatus comprising at least one processor and at least one memory including computer program code, the at least one memory and the computer program code configured to, with the at least one processor, cause an apparatus at least to perform and/or control the method of any of the embodiments 1 to 12.

Embodiment 18

An apparatus configured to perform and/or control or comprising respective means for performing and/or controlling the method of any of the embodiments 13 to 15.

Embodiment 19

An apparatus comprising at least one processor and at least one memory including computer program code, the at least one memory and the computer program code configured to, with the at least one processor, cause an apparatus at least to perform and/or control the method of any of the embodiments 13 to 15.

Embodiment 20

A tangible computer-readable medium storing computer program code, the computer program code when executed by a processor causing an apparatus to perform and/or control:

determining a suitability to serve as a relay device for a relayed communication between a first device and a second device via one or more relay devices to be selected among one or more relay device candidates;

transmitting a message as part of a relay discovery procedure, and with the apparatus acting as one of the one or more relay device candidates; and performing at least one of a transmit power adjustment and/or a radio resource selection for transmitting the message based, at least in part, on the determined suitability.

Embodiment 21

A tangible computer-readable medium storing computer program code, the computer program code when executed by a processor causing an apparatus to perform and/or control:

receiving a message as part of a relay discovery procedure for a relayed communication between a first device and the apparatus via one or more relay devices to be selected among one or more relay device candidates, wherein the message is received via a certain SL radio resource;

selecting a relay device based, at least in part, on the SL radio resource through which the message is received; and sending a further message enabling the relayed communication towards the first device via the selected relay device.

Embodiment 22

A system, comprising:

at least one apparatus (e.g. relay device respectively relay device candidate) according to embodiment 16 or 17; and at least one apparatus (e.g. target device) according to embodiment 18 or 19.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/ system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus, comprising:
at least one processor; and
at least one memory including computer program code, the at least one memory and the computer program code configured to, with the at least one processor, cause the apparatus to at least perform:
obtaining a configuration by receiving the configuration from a mobile communication network;

receiving a communication request message transmitted by a first device;
determining a suitability to serve as a relay device for a relayed communication between the first device and a second device via one or more relay devices to be selected among one or more relay device candidates,
wherein the first device and the second device comprise user equipment, UE, and the relayed communication comprises a relayed sidelink, SL, UE-to-UE communication,
wherein the suitability is determined based on:
whether at least one service is to be provided via the relayed communication,
whether a service, application, or group identifier carried in the communication request message is included as a configured service of the obtained configuration,
a range between the apparatus and a prior-hop device along a discovery path from the first device to the second device through the apparatus,
a Reference Signal Received Power, RSRP of a reference signal transmitted by the prior-hop device, and
a Reference Signal Received Quality, RSRQ of a reference signal transmitted by the prior-hop device;
transmitting a message as part of a relay discovery procedure, and with the apparatus acting as one of the one or more relay device candidates,
wherein the message comprises control information indicative of a relay selection factor, RSF, which is adjustable by the apparatus prior to transmitting the message,
wherein the message is transmitted responsive to receiving the communication request message; and
performing a transmit power adjustment and a radio resource selection for transmitting the message based, at least in part, on the determined suitability,
wherein the performing is based on weighted criteria, the weighted criteria comprising:
a condition of a prior hop along a discovery path from the first device to the second device through the apparatus;
a resource availability:
a resource stability;
a relaying load of the apparatus; and
one or more Quality of Service, QoS, requirements of at least one service to be provided via the relayed communication,
wherein a respective weight of each weighted criterion of the weighted criteria is selected based on the following conditions:
considering a reason for establishing the relayed communication; and
considering a hop index of the apparatus along a discovery path from the first device to the second device through the apparatus,
wherein the radio resource via which the message is transmitted indicates SL Discontinuous Reception, DRX, information associated with the apparatus.

* * * * *